(12) United States Patent
Ma et al.

(10) Patent No.: US 11,233,786 B2
(45) Date of Patent: Jan. 25, 2022

(54) ONE-TIME DYNAMIC POSITIONING AUTHENTICATION METHOD AND SYSTEM AND PASSWORD ALTERATION METHOD

(71) Applicant: Dalian Magic Image Technology Co., Ltd., Liaoning (CN)

(72) Inventors: Yuntao Ma, Liaoning (CN); Wei Liu, Liaoning (CN); Guanhua Sun, Liaoning (CN); Yongsheng Xu, Liaoning (CN); Jun Huang, Liaoning (CN)

(73) Assignee: Dalian Magic Image Technology Co., Ltd., Liaoning (CN)

( * ) Notice: Subject to any disclaimer, the term of this patent is extended or adjusted under 35 U.S.C. 154(b) by 778 days.

(21) Appl. No.: 16/073,460

(22) PCT Filed: Jan. 25, 2017

(86) PCT No.: PCT/CN2017/072628
§ 371 (c)(1),
(2) Date: Jul. 27, 2018

(87) PCT Pub. No.: WO2017/129134
PCT Pub. Date: Aug. 3, 2017

(65) Prior Publication Data
US 2021/0218731 A1    Jul. 15, 2021

(30) Foreign Application Priority Data

Jan. 29, 2016 (CN) .......................... 201610066012.3

(51) Int. Cl.
*H04L 29/06* (2006.01)
*H04L 29/08* (2006.01)

(52) U.S. Cl.
CPC ........ *H04L 63/0838* (2013.01); *H04L 63/107* (2013.01); *H04L 63/20* (2013.01); *H04L 67/1008* (2013.01)

(58) Field of Classification Search
CPC ... H04L 63/0838; H04L 63/107; H04L 63/20; H04L 63/1008; H04L 63/145; H04W 12/08
(Continued)

(56) References Cited

U.S. PATENT DOCUMENTS 8,191,126 B2 * 5/2012 Raghavan ............... G06F 21/36
726/7
9,787,736 B2 * 10/2017 Do ........................ H04L 65/80
2014/0075549 A1 3/2014 Lewis et al.

FOREIGN PATENT DOCUMENTS

CN      104700007 A      6/2015
CN      104978144 A      10/2015
(Continued)

OTHER PUBLICATIONS

International Search Report for Application No. PCT/CN2016/072628, dated Feb. 28, 2017 (7 pages).
(Continued)

*Primary Examiner* — Longbit Chai
(74) *Attorney, Agent, or Firm* — K & L Gates

(57) ABSTRACT

Provided in the present application are a one-time dynamic positioning authentication method, system and password changing method. The method comprises: an authentication server receives an authentication request from a client, generates a positioning factor string, and transmits generated information containing the positioning factor string and a structure of an all-element dynamic factor table to the client; the client receives the generated information, generates the all-element dynamic factor table, and maps the positioning factor string into the all-element dynamic factor table to
(Continued)

acquire a dynamic graphical password inputted in accordance with a first positioning rule by a user and transmit to the authentication server; the authentication server receives the dynamic graphical password from the client, and if the first positioning rule corresponding to the parsed dynamic graphical password is consistent with a preset positioning rule, then the authentication is successful. The graphic passwords being visual and easy to remember, combined with the variability of one-time dynamic passwords, improves the overall convenience and security of an authentication system.

17 Claims, 22 Drawing Sheets

(58) Field of Classification Search
USPC .............................................................. 726/4
See application file for complete search history.

(56) References Cited

FOREIGN PATENT DOCUMENTS

| | | |
|---|---|---|
| CN | 105743893 A | 7/2016 |
| JP | 2005196800 A | 7/2005 |
| JP | 2006301684 A | 11/2006 |
| JP | 2007264839 A | 10/2007 |
| JP | 2011253433 A | 12/2011 |
| JP | 2014215853 A | 11/2014 |
| KR | 20140075855 A | 6/2014 |
| WO | WO2011099161 A1 | 8/2011 |

OTHER PUBLICATIONS

Extended European Search Report for Application No. 17743749.8, dated Aug. 21, 2019 (10 pages).

* cited by examiner

| A | D | C | | A | G | D |
|---|---|---|---|---|---|---|
| F | G | G | | D | C | A |
| A | C | F | | G | B | G |

| C | A | B | | B | F | E |
|---|---|---|---|---|---|---|
| E | F | D | | E | D | F |
| F | C | A | | C | B | F |

Fig.3

| 1 | 7 | 1 | | 2 | 9 | 4 |
|---|---|---|---|---|---|---|
| 3 | 6 | 5 | | 5 | 8 | 7 |
| 1 | 4 | 8 | | 6 | 1 | 0 |

| 9 | 1 | 5 | | 5 | 0 | 2 |
|---|---|---|---|---|---|---|
| 4 | 8 | 4 | | 8 | 5 | 7 |
| 5 | 6 | 3 | | 7 | 0 | 1 |

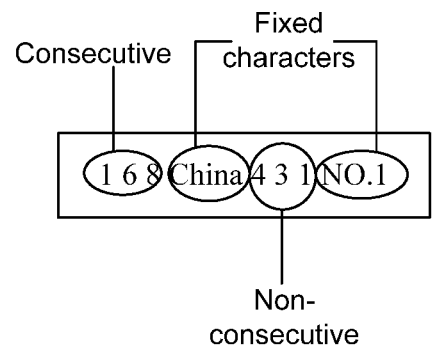
Fig.15B
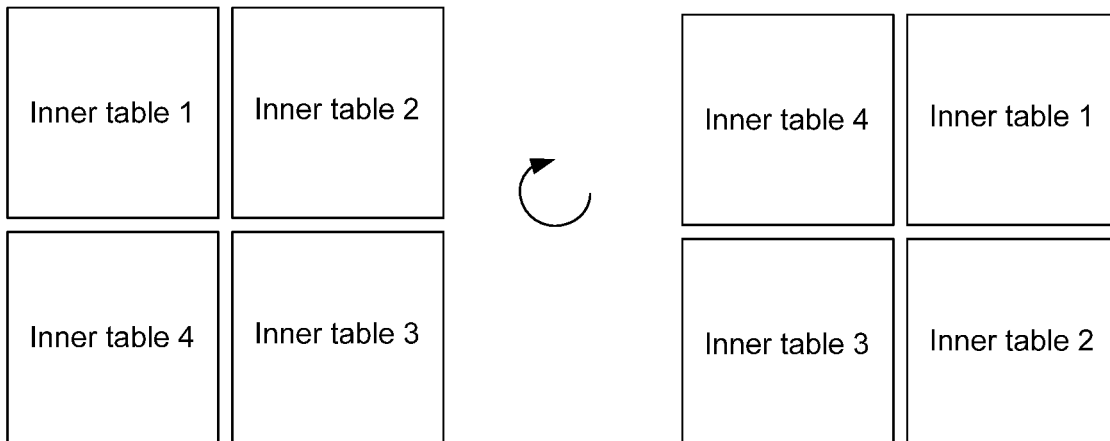
Fig.16
Fig.17

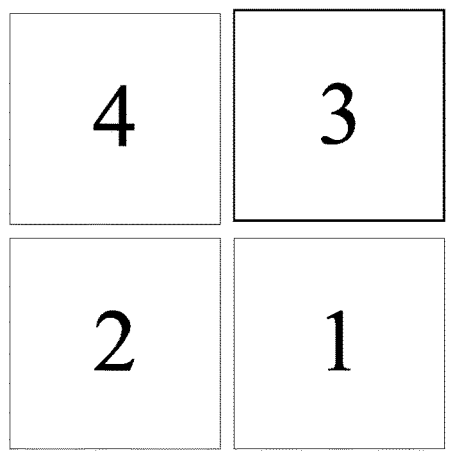
Fig.20B
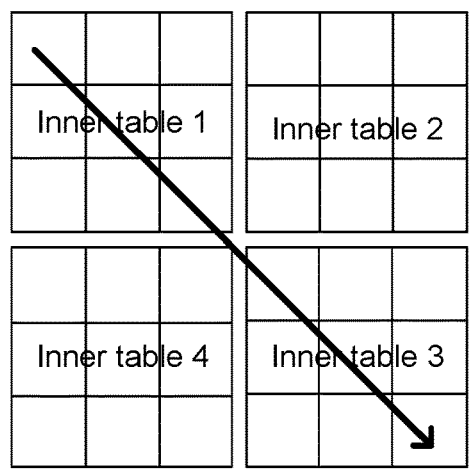
Fig.21A
Fig.21B

ONE-TIME DYNAMIC POSITIONING AUTHENTICATION METHOD AND SYSTEM AND PASSWORD ALTERATION METHOD

CROSS-REFERENCE TO RELATED APPLICATION

The present application is a U.S. National Stage Entry under 35 U.S.C. 0.371 of International Patent Application No. PCT/CN2017/072628, titled ONE-TIME DYNAMIC POSITIONING AUTHENTICATION METHOD, SYSTEM AND PASSWORD CHANGING METHOD, filed on Jan. 25, 2017 which application claims priority under 35 U.S.C. 119(b) and 37 CFR 1.55 to Chinese Patent Application No. 201610066012.3, titled ONE-TIME DYNAMIC POSITIONING AUTHENTICATION METHOD, SYSTEM AND PASSWORD CHANGING METHOD filed on Jan. 29, 2016, the entire disclosures of which are incorporated herein by reference in their entireties.

TECHNICAL FIELD

The present application relates to the technical field of cyber security, and in particular, to a one-time dynamic positioning authentication method and system and password alteration method.

BACKGROUND

With the development of Internet technologies, an increasing number of websites are capable of providing Internet services. In order to obtain a service provided by a website, a user needs to log into a target service website by using a network terminal, and then obtain the service provided by the target service website by accessing the target service website. In order to ensure the security of network access, it is necessary for the target service website to authenticate the identity of the user on the network terminal side.

A common user identity authentication method conducts authentication in a manner of using a user name plus a password, in which the user name and the password will be fixed once confirmed, and are therefore extremely easy to be cracked. In order to improve the security of the fixed user name and password, a target service website providing a service has to pose various restrictions on the setting of the user name and password which are determined by the user through a network terminal, for example, the user name and password should be a combination of uppercase English letters, lowercase English letters, numerals and/or symbols. Consequently, not only is the user provided with a poor experience, but also the password is complex and difficult to remember. Even so, specific information of the user name and the password can still be easily obtained by simple means such as Trojan, phishing, and the like.

An improved user identity authentication method conducts authentication in other manners, such as dynamic password, token, and the like, which are popular user identity authentication methods at present, the main means of which including a dynamic password, a mobile token, a USB key, biometric authentication, etc. However, the implementation of these technologies depends upon hardware or third-party plug-in, as a result of which there still remains a security threat. For example, for a user identity authentication method using a mobile dynamic password, a short message service (SMS) message needs to be transmitted via a telecom operator, however, due to the attack means, such as illegal pseudo base station, Trojan, attacking service website platforms/radio towers, and the like, it is difficult to ensure the security of this authentication method; and for a user identity authentication method using a hardware token such as a mobile token, based on time error between network devices, user operation time, or other factors, an attacker can obtain token content in a short time and crack an account to steal user information, therefore, it is also difficult to ensure the security.

SUMMARY

The present application provides a one-time dynamic positioning authentication method and system and password alteration method, to resolve a defect problem of an existing conventional password.

To resolve the foregoing technical problem, embodiments of the present application disclose the following technical solutions:

A one-time dynamic positioning authentication method includes:

receiving, by an authentication server, an authentication request from a client;

generating a positioning factor string based on positioning factors selected from a positioning factor library, and transmitting generated information including the positioning factor string and a structure of a full-element dynamic factor table to the client;

receiving, by the client, the generated information, generating the full-element dynamic factor table based on the structure of the full-element dynamic factor table, and mapping the positioning factor string into the full-element dynamic factor table;

obtaining a dynamic graphical password input by a user according to a first positioning rule, and transmitting the dynamic graphical password to the authentication server; and receiving, by the authentication server, the dynamic graphical password from the client, and determining that authentication succeeds if the first positioning rule obtained through parsing, corresponding to the dynamic graphical password, is consistent with a preset positioning rule.

Preferably, determining the structure of the full-element dynamic factor table through negotiation between the authentication server and the client, wherein the structure of the full-element dynamic factor table includes a structure of outer table shape and a structure of inner table shape.

Preferably, the determining the structure of the full-element dynamic factor table through the negotiation includes using a uniform structure of the full-element dynamic factor table.

Preferably, the authentication request includes a user ID, and the structure of the full-element dynamic factor table corresponding to the user is determined based on the user ID.

Preferably, the generated information further includes an inner table change manner; and the mapping the positioning factor string into the full-element dynamic factor table includes:

mapping the positioning factor string into the full-element dynamic factor table based on the change manner.

Preferably, the inner table change manner is determined by the authentication server based on a preset algorithm.

Preferably, the positioning factor includes an English letter, a word, a Chinese character, a numeral, a symbol, an image, or a color.

Preferably, the first positioning rule includes one of combining of consecutive positioning factors, combining of non-consecutive positioning factors, combining of repeated positioning factors at a same location, and combining of fixed characters, or any combination thereof.

Preferably, the transmitting the generated information to the client includes:

transmitting, by the authentication server, the generated information to the client in a character form or in a picture form.

Preferably, the method further includes: obtaining, by the client, a user name of a current user, and using, by the client, the dynamic graphical password as a current user name.

A one-time dynamic positioning authentication method includes:

generating, by a client, a positioning factor string based on positioning factors selected from a positioning factor library, generating a full-element dynamic factor table based on a structure of a full-element dynamic factor table, and mapping the positioning factor string into the full-element dynamic factor table;

obtaining a dynamic graphical password input by a user according to a first positioning rule, and transmitting the dynamic graphical password to an authentication server; and receiving, by the authentication server, the dynamic graphical password from the client, and determining that authentication succeeds if the first positioning rule obtained through parsing, corresponding to the dynamic graphical password, is consistent with a preset positioning rule.

Preferably, the generating the positioning factor string based on positioning factors selected from a positioning factor library includes:

obtaining positioning factors selected by the current user and the total number of positioning factors included in the full-element dynamic factor table; and generating the positioning factor string based on the selected positioning factors and the total number of the positioning factors, where a same positioning factor appears at least twice in the positioning factor string.

Preferably, the first positioning rule includes one of combining of consecutive positioning factors, combining of non-consecutive positioning factors, combining of repeated positioning factors at a same location, and combining of fixed characters, or any combination thereof.

A one-time dynamic positioning authentication system includes: an authentication server providing authentication for a user, a client providing network login and access for the user, and a positioning factor library, where the authentication server includes: a first receiving unit configured to receive information from the client, a first transmitting unit configured to transmit information to the client, and a positioning factor string generation unit, a positioning rule parsing unit, and a password determining unit that are connected to the first receiving unit and the first transmitting unit;

where the positioning factor string generation unit is configured to generate a positioning factor string based on positioning factors selected from a positioning factor library; the first transmitting unit is configured to transmit generated information including the positioning factor string and a structure of a full-element dynamic factor table to the client; and the positioning rule parsing unit is configured to receive a dynamic graphical password input by a user according to a first positioning rule, and obtain, through parsing, the first positioning rule corresponding to the dynamic graphical password; and the password determining unit is configured to determine whether the first positioning rule is consistent with a preset positioning rule, and transmit a determining result to the client by using the first transmitting unit; and the client includes: a second receiving unit configured to receive information from the authentication server, a second transmitting unit configured to transmit information to the authentication server, and a full-element dynamic factor table display unit and a dynamic graphical password generation unit that are connected to the second receiving unit and the second transmitting unit;

where the full-element dynamic factor table display unit is configured to map the positioning factor string into the full-element dynamic factor table; and the dynamic graphical password generation unit is configured to generate the dynamic graphical password based on input of the user in the full-element dynamic factor table according to the first positioning rule, and transmit the dynamic graphical password to the authentication server by the second transmitting unit.

Preferably, between the first receiving unit and the first transmitting unit, the server further includes a first negotiation unit configured to negotiate the structure of the full-element dynamic factor table with the client; and between the second receiving unit and the second transmitting unit, the client further includes a second negotiation unit configured to negotiate the structure of the full-element dynamic factor table with the server.

Preferably, the system further includes: a load equalizer, connected to the authentication server, configured to determine whether a load of received authentication requests is greater than a set load threshold, and allocate the last received authentication request to another authentication server if the load is greater than the set load threshold.

A one-time dynamic password alteration method includes:

obtaining, by an authentication server, a password alteration request from a client;

generating two positioning factor strings based on a full-element dynamic factor table, and transmitting the two positioning factor strings to the client at one time;

by the client, receiving the two positioning factor strings, mapping the two positioning factor strings into the full-element dynamic factor tables, respectively, obtaining a first dynamic graphical password, input by a user, from a first full-element dynamic factor table according to a first positioning rule and a second dynamic graphical password, input by the user, from a second full-element dynamic factor table according to a second positioning rule, and transmitting the first dynamic graphical password and the second dynamic graphical password to the authentication server;

receiving, by the authentication server, the two dynamic graphical passwords from the client; and if the first positioning rule and the second positioning rule obtained through parsing, corresponding to the two dynamic graphical passwords, are the same, using the first positioning rule or the second positioning rule as a new dynamic graphical password, indicating that password alteration succeeds; or otherwise, indicating that password alteration fails; and receiving, by the client, a password alteration success or failure result transmitted by the authentication server.

Preferably, obtaining, by the authentication server, a pre-alteration password, the first dynamic graphical password, and the second dynamic graphical password includes:

Obtaining firstly, by the authentication server, the pre-alteration password from the client, and if the pre-alteration password is the same as a preset password, obtaining secondly the first dynamic graphical password and the second dynamic graphical password; or obtaining simultaneously, by the authentication server, the pre-alteration password, the first dynamic graphical password, and the second dynamic graphical password from the client.

A one-time dynamic positioning authentication method includes:

obtaining, by a client, a structure of a full-element dynamic factor table;

selecting positioning factors from a positioning factor library based on the structure of the dynamic factor table, and generating a positioning factor string;

inputting, by a user, a dynamic graphical password based on the full-element dynamic factor table generated based on the positioning factor string, and transmitting an authentication information including the dynamic graphical password and information of the full-element dynamic factor table to an authentication server; and receiving, by the authentication server, the dynamic graphical password from the client, and determining that authentication succeeds if a positioning rule obtained through parsing, corresponding to the dynamic graphical password, is consistent with a preset positioning rule.

Preferably, the obtaining, by a client, the structure of the full-element dynamic factor table includes:

transmitting, by the client, an authentication request to the authentication server; and determining, by the authentication server, the structure of the full-element dynamic factor table based on the authentication request, and transmitting the structure of the full-element dynamic factor table to the client.

A one-time dynamic positioning authentication system includes: an authentication server providing an authentication service for a network access user and a client that is connected to the authentication server over a network and provides network login and access for the user, where the client includes: a dynamic factor table structure obtaining unit, an information processing unit, and a first transmitting unit configured to transmit information to the authentication server;

where the dynamic factor table structure obtaining unit is configured to obtain a structure of a full-element dynamic factor table;

the information processing unit is configured to select positioning factors from a positioning factor library based on the dynamic factor table structure, and generate a positioning factor string; and input, by the user, a dynamic graphical password based on a full-element dynamic factor table generated based on the positioning factor string; and the first transmitting unit is configured to transmit authentication information including the dynamic graphical password and information of the full-element dynamic factor table to the authentication server; and the authentication server includes: a first receiving unit configured to receive information from the client, a positioning rule parsing unit, and a password determining unit;

where the positioning rule parsing unit is configured to obtain, through parsing, a positioning rule corresponding to the dynamic graphical password; and the positioning rule determining unit is configured to determine that authentication succeeds if the positioning rule corresponding to the dynamic graphical password is consistent with a preset positioning rule.

A one-time dynamic positioning authentication method includes:

obtaining, by a client, a structure of a full-element dynamic factor table;

selecting positioning factors from a positioning factor library based on the dynamic factor table structure and generating a first positioning factor string;

inputting, by a user, a dynamic graphical password based on a first full-element dynamic factor table generated based on the first positioning factor string, and transmitting an authentication information including the dynamic graphical password to an authentication server;

receiving, by the authentication server, the authentication information transmitted by the client;

generating a second full-element dynamic factor table that is the same as the first full-element dynamic factor table; and parsing the dynamic graphical password based on the second full-element dynamic factor table, and determining that authentication succeeds if a positioning rule obtained through parsing, corresponding to the dynamic graphical password, is consistent with a preset positioning rule.

A one-time dynamic positioning authentication system includes: an authentication server providing an authentication service for a network access user and a client that is connected to the authentication server over a network and provides network login and access for the user, where the client includes: a dynamic factor table structure obtaining unit, an information processing unit, and a first transmitting unit configured to transmit information to the authentication server;

where the dynamic factor table structure obtaining unit is configured to obtain a structure of a full-element dynamic factor table;

the information processing unit is configured to select positioning factors from a positioning factor library based on the dynamic factor table structure and generate a first positioning factor string; and input, by the user, a dynamic graphical password based on a first full-element dynamic factor table generated based on the first positioning factor string; and the first transmitting unit is configured to transmit an authentication information including the dynamic graphical password to the authentication server; and the authentication server includes: a first receiving unit configured to receive information from the client, a dynamic factor table generation unit, a positioning rule parsing unit, and a password determining unit;

where the dynamic factor table generation unit is configured to generate a second full-element dynamic factor table that is the same as the first full-element dynamic factor table;

the positioning rule parsing unit is configured to parse the dynamic graphical password based on the second full-element dynamic factor table, to obtain a positioning rule corresponding to the dynamic graphical password; and the positioning rule determining unit is configured to determine that authentication succeeds if the positioning rule corresponding to the dynamic graphical password is consistent with a preset positioning rule.

A one-time dynamic password alteration method includes:

obtaining, by a client, a structure of a full-element dynamic factor table;

selecting positioning factors from a positioning factor library based on the dynamic factor table structure, and generating two positioning factor strings;

inputting, by a user, two dynamic graphical passwords based on two full-element dynamic factor tables generated based on the two positioning factor strings, and transmitting password alteration information including the two dynamic graphical passwords and information of the two full-element dynamic factor tables to an authentication server;

receiving, by the authentication server, the two dynamic graphical passwords from the client, obtaining a first positioning rule and a second positioning rule corresponding to the two dynamic graphical passwords through parsing based on the information of the two full-element dynamic factor tables; and if the first positioning rule and the second positioning rule are the same, using the first positioning rule or the second positioning rule as a new dynamic graphical password, indicating that password alteration succeeds, or otherwise, indicating that password alteration fails; and receiving, by the client, a password alteration success or failure result transmitted by the authentication server.

A one-time dynamic password alteration method includes:

obtaining, by a client, a structure of a full-element dynamic factor table;

selecting positioning factors from a positioning factor library based on the structure of the dynamic factor table, and generating two first positioning factor strings;

inputting, by a user, two dynamic graphical passwords based on two first full-element dynamic factor tables generated based on the two first positioning factor strings, and transmitting a password alteration information including the two dynamic graphical passwords to an authentication server;

receiving, by the authentication server, the password alteration information transmitted by the client;

generating two second full-element dynamic factor tables that are the same as the two first full-element dynamic factor tables;

obtaining a first positioning rule and a second positioning rule corresponding to the two dynamic graphical passwords through parsing based on the two second full-element dynamic factor tables; and if the first positioning rule and the second positioning rule are the same, using the first positioning rule or the second positioning rule as a new dynamic graphical password, indicating that password alteration succeeds; or otherwise, indicating that password alteration fails; and receiving, by the client, a password alteration success or failure result transmitted by the authentication server.

As can be seen from the foregoing technical solutions, the one-time dynamic positioning authentication method and system and password alteration method provided in the embodiments of the present application have beneficial effects as follows:

1. During authentication, a dynamic graphical password is input by a user based on a full-element dynamic factor table according to a positioning rule, which combines a dynamic password with a graphical password to form a new password. The new password has not only the variability of the dynamic password, but also the imagery and being easy to remember of the graphical password. In addition, the defects that the graphical password has a simple form and does not change, and that the authentication based on the dynamic password needs to use a mobile phone, a base station, hardware, or other media are avoided.

2. The full-element dynamic factor table provided according to this embodiment includes a structure of outer table shape and a structure of inner table shape, and the structure of the full-element dynamic factor table may change depending on a user requirement. In addition, because not only the shape structures of a plurality of inner tables but also the positioning factors in each inner table are changeable, a different full-element dynamic factor table is displayed each time a dynamic graphical password is input. Accordingly, the input of the password does not need deliberately blocking, and is immune against peep. Even if the dynamic graphical password is intercepted, the positioning rule still cannot be cracked according to the intercepted dynamic graphical password, and thus user information can be protected.

3. The types of positioning factors in a positioning factor library include: English letter, word, Chinese character, numeral, symbol, image, color, etc., which improves the randomness and anti-counterfeiting performance of the full-element dynamic factor table. The dynamic graphical password set by the user includes a combination of consecutive positioning factors, a combination of non-consecutive positioning factors, a repetition of positioning factors at the same location, conventional fixed characters, and any combination thereof. Therefore, the flexibility and diversification of the dynamic graphical password are further enhanced, and the dynamic graphical password has a low repetition rate and an increased complexity, making it more hard to crack the input dynamic graphical password.

4. The client uses the dynamic graphical password, input by the user, having a certain positioning rule, as a user password, which is easier to remember as compared with a current fixed character password or graphical password. Moreover, a problem that a conventional fixed password provides poor user experience due to excessive restrictions is resolved. In the one-time dynamic positioning authentication method provided in according to the present application, the right to set a password is given to the user, and the positioning rule can be freely set by the user, so as to generate a dynamic graphical password, and thus the problem resulted by the user forgetting the password is avoided and the user experience is improved.

5. Transmission is performed between the client and the server over a secure SSL (Secure Sockets Layer) communication link, and data transmitted is encrypted data. Moreover, the full-element dynamic factor table and the input dynamic graphical password change each time. Therefore, even if the input dynamic graphical password is intercepted, the real positioning graphic of the user still cannot be cracked, and thereby it is possible that the dynamic graphic password is immune against interception and crack, and has a high anti-counterfeiting performance and security.

6. The dynamic graphical password input by the user is implemented by means of software, independent of any hardware terminal device, which reduces the purchase and management expenses related to password management, greatly save costs, and effectively avoids a system security thread resulted from loss, failure, damage, or other problems of an external hardware terminal device. In addition, a limitation in use of the hardware terminal device is also effectively avoided, and password authentication can be performed freely on various platforms on a PC or a mobile terminal without limitations by external physical conditions such as time and space.

7. In the one-time dynamic password alteration method provided according to the present application, password alteration succeeds only when the authentication server determines that two positioning rules are the same. Because the full-element dynamic factor tables corresponding to the input of the two dynamic graphical passwords are different, the two dynamic graphical passwords are also different. As a result, the dynamic graphical password will not be cracked when stolen or intercepted. Compared with a prior password alteration method, the password alteration method according to the present disclosure has higher security and anti-counterfeiting performance.

BRIEF DESCRIPTION OF DRAWINGS

To describe the technical solutions in the embodiments of the present application more clearly, the accompanying drawings required for describing the embodiments are briefly described below. Apparently, those of ordinary skill in the art may still derive other drawings from these accompanying drawings without creative efforts.

FIG. 3 is a schematic diagram illustrating a full-element dynamic factor table with positioning factors of English letters according to an embodiment of the present application;

FIG. 4 is a schematic diagram illustrating a full-element dynamic factor table with positioning factors of numerals according to an embodiment of the present application;

FIG. 12A, FIG. 12B, and FIG. 12C are schematic diagrams of three positioning rules of combining of non-consecutive positioning factors according to an embodiment of the present application;

FIG. 13 is a schematic diagram illustrating a positioning rule of combining of repeated positioning factors at the same location according to an embodiment of the present application;

FIG. 14 is a schematic diagram illustrating a positioning rule of combining of fixed characters according to an embodiment of the present application;

FIG. 15A and FIG. 15B are schematic diagrams illustrating two positioning rules of combining of distributed positioning factors according to an embodiment of the present application;

FIG. 16 is a schematic diagram illustrating a positioning rule of combining of a plurality of forms according to an embodiment of the present application;

FIG. 17 is a schematic diagram illustrating clockwise rotation change of an inner table in a full-element dynamic factor table according to an embodiment of the present application;

FIG. 20A and FIG. 20B show a full-element dynamic factor table with an inner table form in a pre-alteration mode and with the inner table form post-alteration displayed on a client, respectively;

FIG. 21A and FIG. 21B show another full-element dynamic factor table with an inner table form in a pre-alteration mode and with the inner table form post-alteration displayed on a client, respectively;

DESCRIPTION OF EMBODIMENTS

In order to make those skilled in the art understand the technical solutions in the present application better, the technical solutions in the embodiments of the present application are described clearly and completely with reference to the accompanying drawings in conjunction with the embodiments of the present application.

Figure 1:
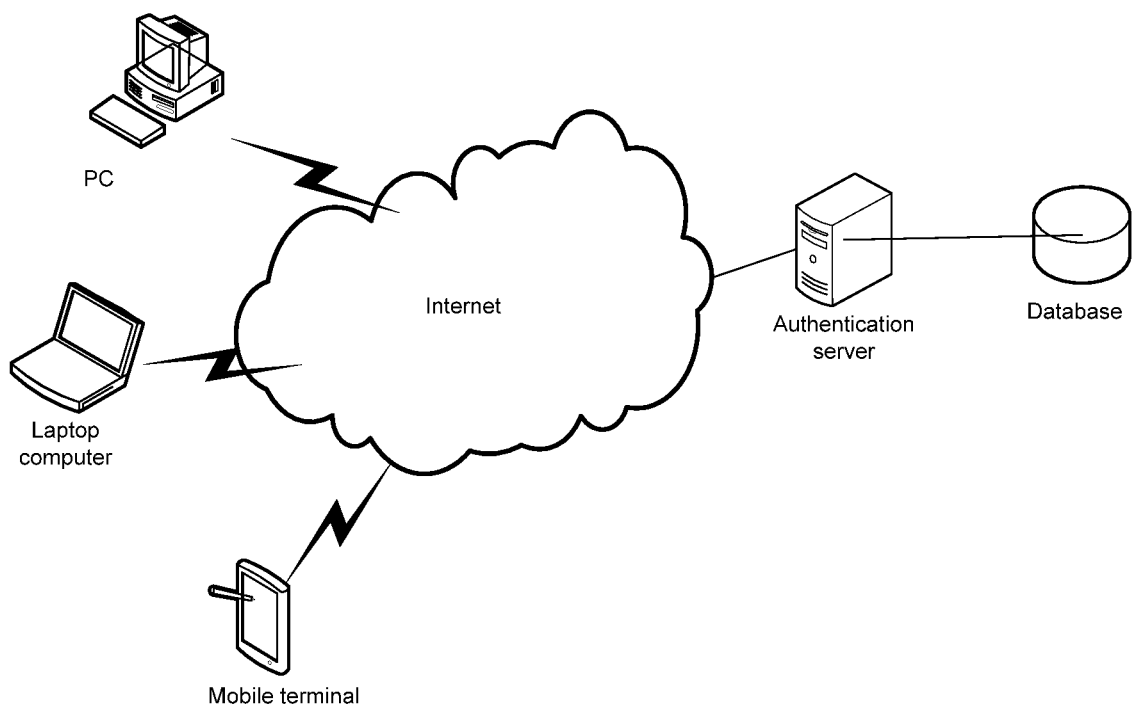
FIG. 1 is a schematic structural diagram illustrating a one-time dynamic positioning authentication system according to an embodiment of the present application.

FIG. 1 is a schematic structural diagram illustrating a one-time dynamic positioning authentication system according to an embodiment. As shown in FIG. 1, the one-time dynamic positioning authentication system includes: a client, an authentication server, and a database. The authentication server includes the database. The database includes a positioning factor library. Alternatively, the positioning factor library is stored in an attribute file. The positioning factor library is configured to store positioning factors, and is an element set for generating a full-element dynamic factor table. The positioning factor library includes positioning factors of different types, such as English letter, word, Chinese character, numeral, symbol, image, color, or the like. The server may select, based on a registration request from a client, one or more types of positioning factors as selected positioning factors.

The server further includes a memory configured to store a user ID. Transmission, including wired or wireless transmission, between the server and the client is performed via a network. Specifically, the transmission between the client and the server is performed by a communication link based on SSL (Secure Sockets Layer) protocol, thereby ensuring secure information communication. Alternatively, the server and the client may be connected via a dedicated line instead of the Internet. In addition, the client described in this embodiment includes a terminal device, and may specifically include a mobile terminal, a laptop computer, a PC, a palmtop computer, or the like. These terminals are merely exemplary rather than exhaustive, and the client includes, but not limited to, these terminals.

Figure 2:
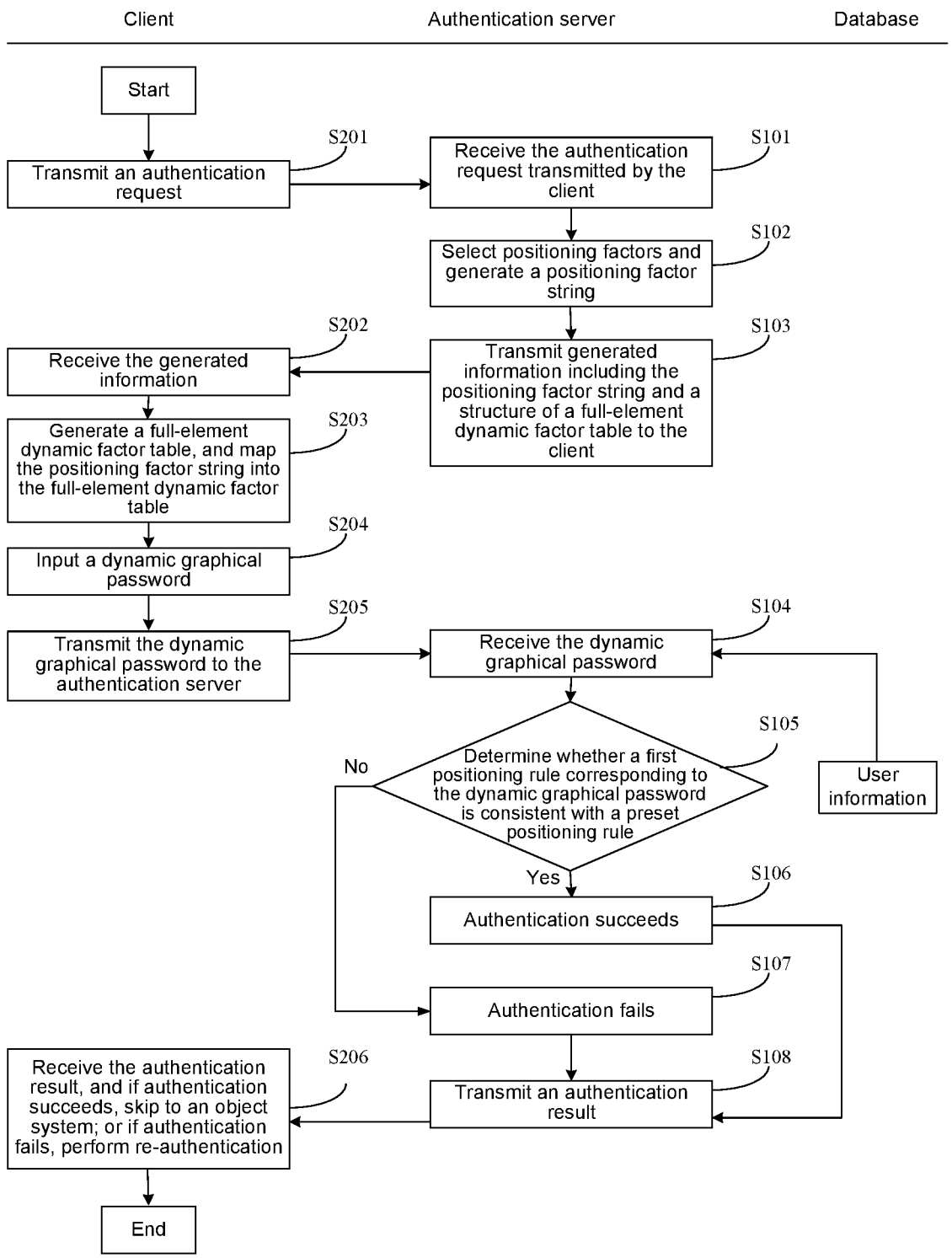
FIG. 2 is a flowchart of a one-time dynamic positioning authentication method according to an embodiment of the present application.

A one-time dynamic positioning authentication method is completely described with reference to FIG. 2. As shown in FIG. 2, the authentication method includes the following steps:

Step S201: A client transmits an authentication request to an authentication server, wherein the authentication request may either include user information, or not include user information. If the authentication request includes user information, the user information is specifically an appellation of the unique identifier, such as user name, account, login ID and the like, of a user in a system.

Step S101: The authentication server receives the authentication request transmitted by the client. The authentication server communicates with the client via a network and SSL protocol, and receives a service request from the client.

Step S102: The authentication server selects positioning factors from a positioning factor library, and generates a positioning factor string. The authentication server may generate a positioning factor string by using a special encryption algorithm.

Figures 4A, 5:
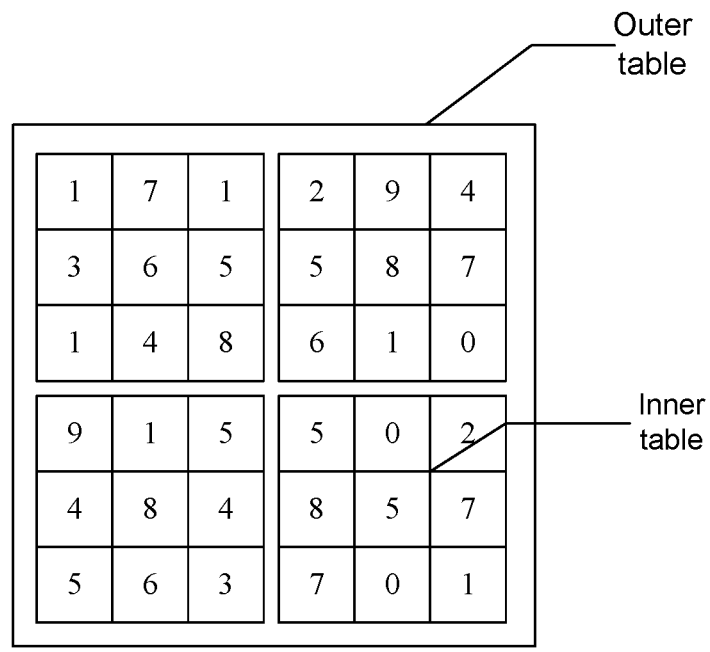
FIG. 4A is a schematic diagram illustrating a full-element dynamic factor table with positioning factors of a hybrid of numerals and English letters according to an embodiment of the present application.
FIG. 5 is a schematic diagram illustrating a full-element dynamic factor table with an inner table and an outer table according to an embodiment of the present application.

The positioning factor string is used as positioning factors in a full-element dynamic factor table. The full-element dynamic factor table is a display mode for prompt, which is formed by the selected positioning factors and positioning factors. The positioning factors in the full-element dynamic factor table, which are the positioning factors selected from the positioning factor library, may change freely and are not fixed. FIG. 3 is a schematic diagram illustrating a full-element dynamic factor table. In the table, all the selected positioning factors are English letters. FIG. 4 is a schematic diagram illustrating another full-element dynamic factor table. In the table, all the selected positioning factors are Arabic numerals. The positioning factors further include one of or a combination of English letter, word, Chinese character, numeral, and symbol. As shown in FIG. 4A, the full-element dynamic factor table includes a combination of English letters and numerals, which can further increase the complexity and variability of the full-element dynamic factor table, thereby increasing the cracking difficulty.

In addition, as shown in FIG. 5, a structure of a full-element dynamic factor table includes a shape structure of an outer table and a shape structure of an inner table shape. Moreover, the structure of the full-element dynamic factor table, as well as a difficulty coefficient of the full-element dynamic factor table, may be determined through negotiation between the authentication server and the client. For example, as shown in FIG. 3 to FIG. 5, the positioning factors selected by a user are in a 6*6 positioning factor display mode. Taking a 6-digit password as an example, the number of positioning graphic combinations of single-type positioning factors is 36 to the power of 6 (i.e., $36^6$). If a 10-digit password is selected for use, the cracking probability of the password is one in 3.656158e+15, i.e., one in $36^{10}$. If the positioning factors are used in combination of fixed characters, the cracking probability will be lower. Alternatively, a 9*9 positioning factor display mode may be selected. As the positioning factors are the more, the password has the higher complexity and the higher security.

In a preferred implementable solution, the client and the authentication server may determine a full-element dynamic factor table through negotiation. Specifically, the authentication server may generate a full-element dynamic factor table in a system-level or user-level manner. In a system-level manner, after receiving the authentication request, the authentication server selects a preset structure of a full-element dynamic factor table and other parameter information for generating a full-element dynamic factor table, and generates a positioning factor string.

In a user-level manner, the authentication server receives a user-level setting indication from the client, and transmits prompt item information for generating a full-element dynamic factor table to the client based on the user-level setting indication; after filling in the indication item information, the client transmits the item information to the authentication server; and the authentication server receives the item information, and generates a positioning factor string based on the item information. Specifically, in a user-level setting process, the item information includes: an outer table structure and an inner table structure of the full-element dynamic factor table, the number of inner tables, and positioning factors in the inner tables. For example, after receiving the authentication request from the client, the authentication server transmits a setting item list to the client, wherein the setting item list includes: options about whether the outer table structure is a regular shape, whether the inner table structure is a regular shape, the number of inner tables, the type/kind of positioning factor in inner tables, etc. After the user fills in the list on the client based on preferences, a filling completion signal instruction is transmitted to the authentication server. After receiving the signal instruction, the authentication server selects parameter information for generating a structure of a full-element dynamic factor table, and determines a positioning factor string.

In this embodiment, in order to ensure the reliability of the password, the user needs to input a dynamic graphical password. Therefore, the authentication server correspondingly generates a positioning factor string. A special algorithm, including a formula, a random permutation-combination, or a set unified algorithm, may be used.

Specifically, for example, the positioning factors selected by the user through negotiation between the client and the server are of only a numeral type, and the outer table structure and the inner table structure of the full-element dynamic factor table are both regular structures, where the outer table includes four 3*3 inner tables, and each inner table includes 9 positioning factors. The positioning factors selected by the server from the positioning factor library based on the outer table structure, the inner table structure, the outer table structure parameter, and the inner table structure parameter are 10 Arabic numerals, namely 0 to 9. Taking 6*6 as an example, the selected positioning factors are Arabic numerals, and each positioning factor string generated by the server includes 36 numerals. After receiving the positioning factor string composed of 36 numerals from the server, the client maps the numerals in the positioning factor string into the full-element dynamic factor table based on the structure of the full-element dynamic factor table.

Figure 6:
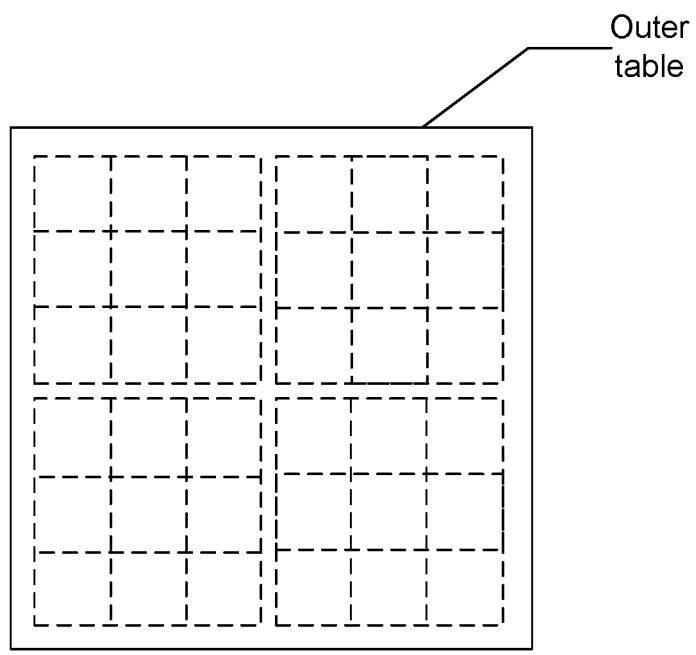
FIG. 6 is a schematic diagram illustrating a full-element dynamic factor table with a regular outer table according to an embodiment of the present application.
Figure 7:
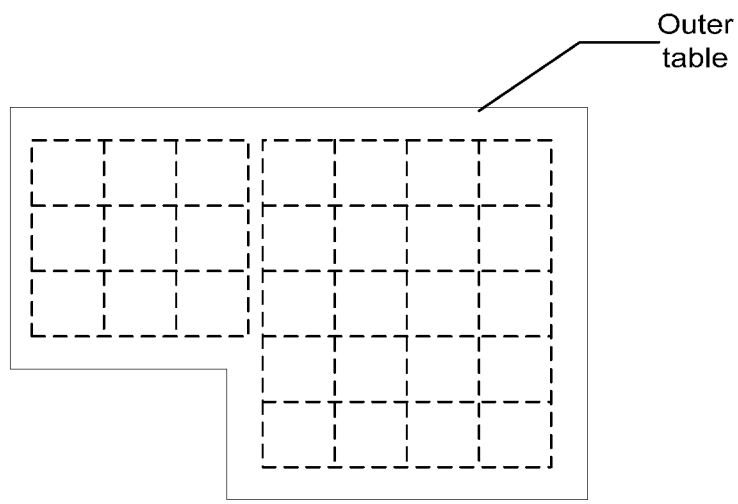
FIG. 7 is a schematic diagram illustrating a full-element dynamic factor table with an irregular outer table according to an embodiment of the present application.
Figure 8:
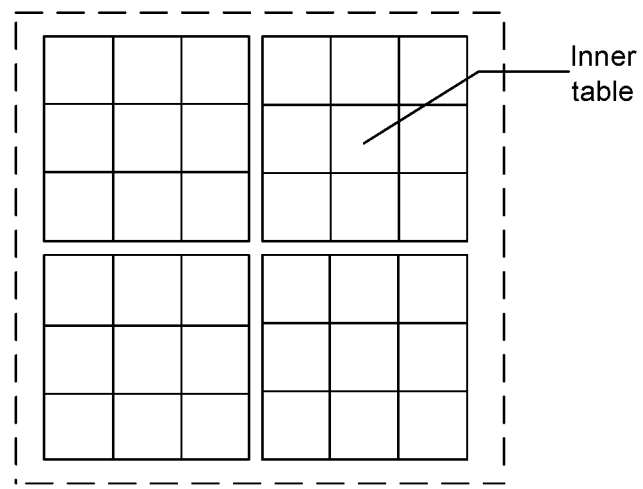
FIG. 8 is a schematic diagram illustrating a full-element dynamic factor table with a regular inner table according to an embodiment of the present application.
Figure 9:
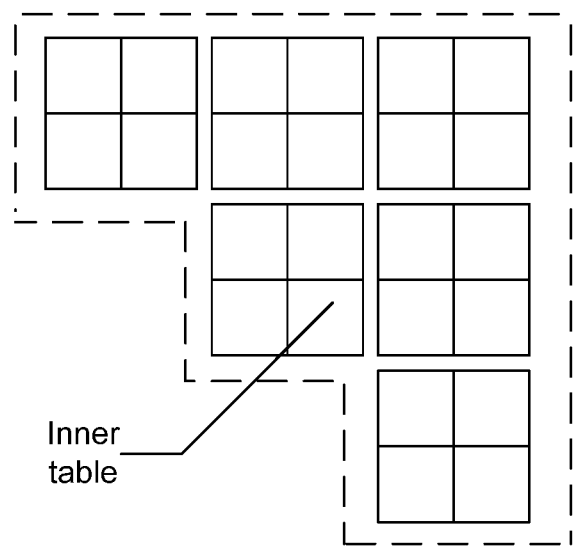
FIG. 9 is a schematic diagram illustrating a full-element dynamic factor table with an irregular inner table according to an embodiment of the present application.

In step S102, the structure of the full-element dynamic factor table includes the structure of outer table shape and the structure of inner table shape. As shown in FIG. 5, the outer table includes at least one inner table, and each inner table includes a plurality of positioning factors. The outer table is not only an external physical shape of the full-element dynamic factor table, but also a concept table including various inner tables and having a table appearance. Moreover, the shape of the outer table is not fixed, which may be a regular shape, as shown in FIG. 6, or an irregular shape, as shown in FIG. 7. The inner table is a separately divided sub-table in the full-element dynamic factor table and may be formed in various modes. The inner table may be a combination in a regular shape, or a combination in an irregular shape, as shown in FIG. 8 and FIG. 9, the inner tables in regular and irregular shapes are respectively shown. The specific shapes of the outer table and the inner table may be determined through negotiation between the server and the client, or the server automatically generates a positioning factor string according to a preset program. The positioning factor string is a data character string converted from the content of the full-element dynamic factor table.

The users prefer to set different full-element dynamic factor tables, which enhances the randomness and uniqueness of a full-element dynamic factor table. Further, because different users have different preferences, different positioning factors are selected by the server based on the preferences of the users, and different full-element dynamic factor tables are generated. The generated information may be transmitted to the client in a character form or a picture form.

As shown in FIG. 2, the method further includes: Step S103: Transmit generated information including the positioning factor string and the structure of the full-element dynamic factor table to the client.

Step S202: The client receives the generated information transmitted by the server.

Step S203: A full-element dynamic factor table is generated based on the positioning factor string from the authentication server. During user authentication, the client needs to input a dynamic graphical password based on the full-element dynamic factor table to confirm a positioning graphic used as a password. Therefore, the client needs to firstly transmit a dynamic graphical password request, i.e., an authentication request, to the authentication server to instruct the authentication server to generate the positioning factor string, and the client can generate the full-element dynamic factor table only after receiving the generated information returned by the authentication server.

The client generates the full-element dynamic factor table based on the outer table structure and the inner table structure of the full-element dynamic factor table, and the positioning factor string generated based on the positioning factors selected from the positioning factor library. As shown in FIG. 10, the positioning factor string generated in step S102 is mapped into the full-element dynamic factor table, and each positioning factor appears at least twice in the full-element dynamic factor table, so as to reduce the cracking probability, and enhance the randomness and anti-counterfeiting performance of the positioning factors in the full-element dynamic factor table.

When displaying the full-element dynamic factor table, the client does not need to load or install any additional plug-in, e.g. ActiveX. The embodiment provides a high compatibility between platforms and avoids the failure that the full-element dynamic factor table cannot be displayed, thereby improving the user experience.

The elements mapped into the full-element dynamic factor table are clearly identifiable, and more recognizable as compared with a currently popular verification code, making it more convenient to input a password.

Step S204: A user inputs a dynamic graphical password based on the full-element dynamic factor table. Specifically, according to a positioning rule already set, e.g., a first positioning rule, the user uses positioning factors (or elements) corresponding to the points, which corresponds to the first positioning rule, as a dynamic graphical password. The dynamic graphical password is formed by the positioning factors in the full-element dynamic factor table according to the first positioning rule.

Figure 10A:
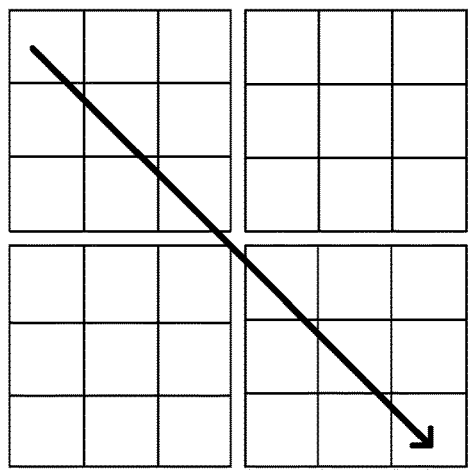
FIG. 10A and FIG. 10B are schematic diagrams illustrating a positioning rule and a one-time authentication manner corresponding to the positioning rule according to an embodiment of the present application embodiment.
Figure 10B:
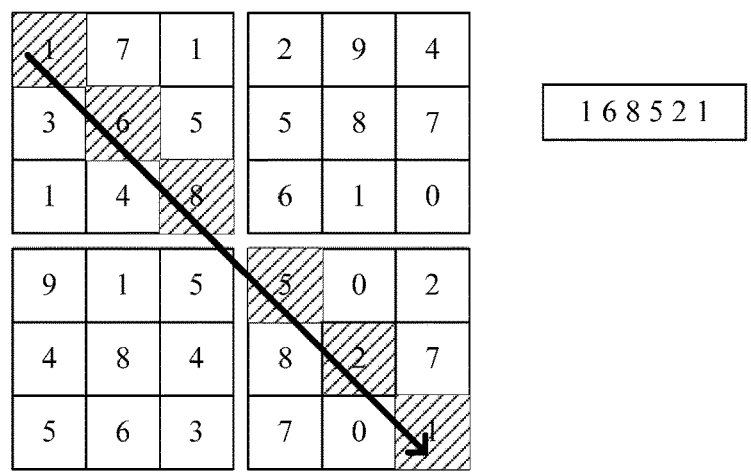

FIG. 10A and FIG. 10B respectively show a first positioning rule input by the user and dynamic elements (or positioning factors) corresponding to the dynamic graphical password input according to the first positioning rule. In this embodiment, the authentication manner is defined as a single-element mode. The single-element mode means that each time the full-element dynamic factor table is displayed, there is a change in the positioning factors therein.

Step S205: After the input of the user completes, the client transmits the dynamic graphical password input by the user to the authentication server.

Step S104: The authentication server receives the dynamic graphical password transmitted by the client.

Step S105: The authentication server parses the dynamic graphical password to obtain the first positioning rule, compares the first positioning rule with a preset positioning rule, and proceeds to step S106.

Step S106: If the first positioning rule, obtained through parsing, corresponding to the dynamic graphical password, is consistent with the preset positioning rule, it is determined that the authentication succeeds. The preset positioning rule is a positioning rule corresponding to the dynamic graphical password registered by the user at first login. The preset positioning rule, which is set by the user during first registration, is stored in a positioning rule database or another attribute file.

In step S105, determining whether the first positioning rule is the same as or consistent with the preset positioning rule means determining whether the action tracks of the first positioning rule and the preset positioning rule in the full-element dynamic factor table are the same. In each full-element dynamic factor table, each positioning factor corresponds to one coordinate location, and the server can obtain the action track of the dynamic graphical password input by the user by identifying the coordinate location(s) corresponding to the positioning rule, so as to determine whether the first positioning rule and the preset positioning rule respectively corresponding to two action tracks are the same. If it is determined that the action tracks of the first positioning rule input by the user and the preset positioning rule are the same, the authentication succeeds. Otherwise, the authentication proceeds to step S107.

Step S107: If the first positioning rule corresponding to the dynamic graphical password from the client is inconsistent with or different from the preset positioning rule, it is determined that the authentication fails, and the authentication server proceeds to step S108.

Step S108: The authentication server generates an authentication result after the determination, and transmits the authentication result to the client. The authentication result includes either an authentication success or an authentication failure.

Step S206: The client receives the authentication result transmitted by the authentication server, and if the authentication succeeds, skips to an object system and performs a user operation; or if the received authentication result indicates a failure, the client provides a feedback message indicating to the user that the authentication fails and a re-authentication is needed.

The one-time dynamic positioning authentication method provided according to this embodiment has beneficial effects as follows:

1. During authentication, a dynamic graphical password is input by a user based on a full-element dynamic factor table according to a positioning rule, which combines a dynamic password and a graphical password to form a new password. The new password has not only the variability of the dynamic password, but also the imagery and being easy to remember of the graphical password. In addition, the defects that the graphical password has a simple form and does not change, and that the authentication based on the dynamic password needs to use a mobile phone, a base station, hardware, or other media are avoided.

2. The client uses the dynamic graphical password, input by the user, having a certain positioning rule, as a user password, which is easier to remember as compared with a current fixed-character password or graphical password. Moreover, a problem that a conventional fixed password provides a poor user experience due to excessive restrictions is resolved. In the one-time dynamic positioning authentication method provided according to this scheme, the right to set a password is given to the user, and the positioning rule can be freely set by the user, so as to generate a dynamic graphical password, as a result of which the user does not need to remember a fixed password by rote, and thus user experience is improved.

3. Transmission is performed between the client and the server over a secure SSL communication link, and data transmitted is encrypted data. Moreover, the full-element dynamic factor table and the input dynamic graphical password change each time, e.g., in an OTP (One Time Password) mode. Therefore, even if the input dynamic graphical password is intercepted, the real positioning graphic of the user still cannot be cracked, as a result of which it is possible that the dynamic graphical password is immune against peep and interception, and is difficult to crack, thereby improving the security of identity authentication.

4. The dynamic graphical password input by the user is implemented by means of software, independent of any hardware terminal device, which reduces the purchase and management expenses related to password management, greatly save costs, and effectively avoids a system security thread resulted from loss, failure, damage, or other problems of an external hardware terminal device. In addition, a limitation in use of the hardware terminal device is also effectively avoided, and password authentication can be performed freely on various platforms on a PC or a mobile terminal without limitations by external physical conditions such as time and space.

Figure 11:
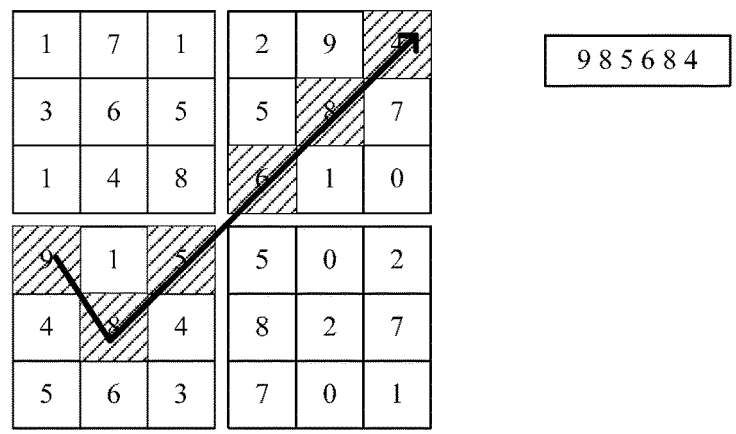
FIG. 11 is a schematic diagram illustrating a positioning rule of combining of consecutive positioning factors according to an embodiment of the present application.
Figures 12A, 12B, 12C:
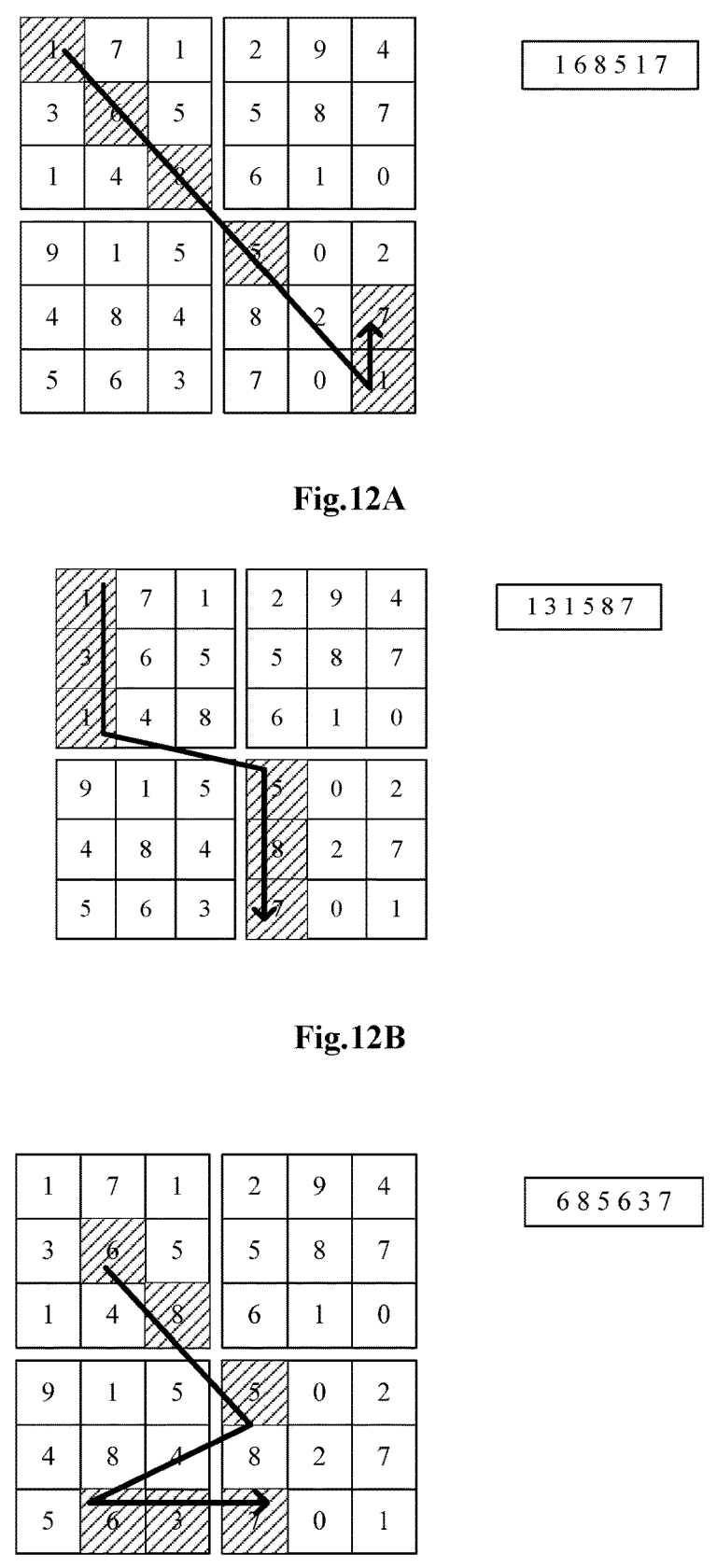
Figures 13, 14, 15A:
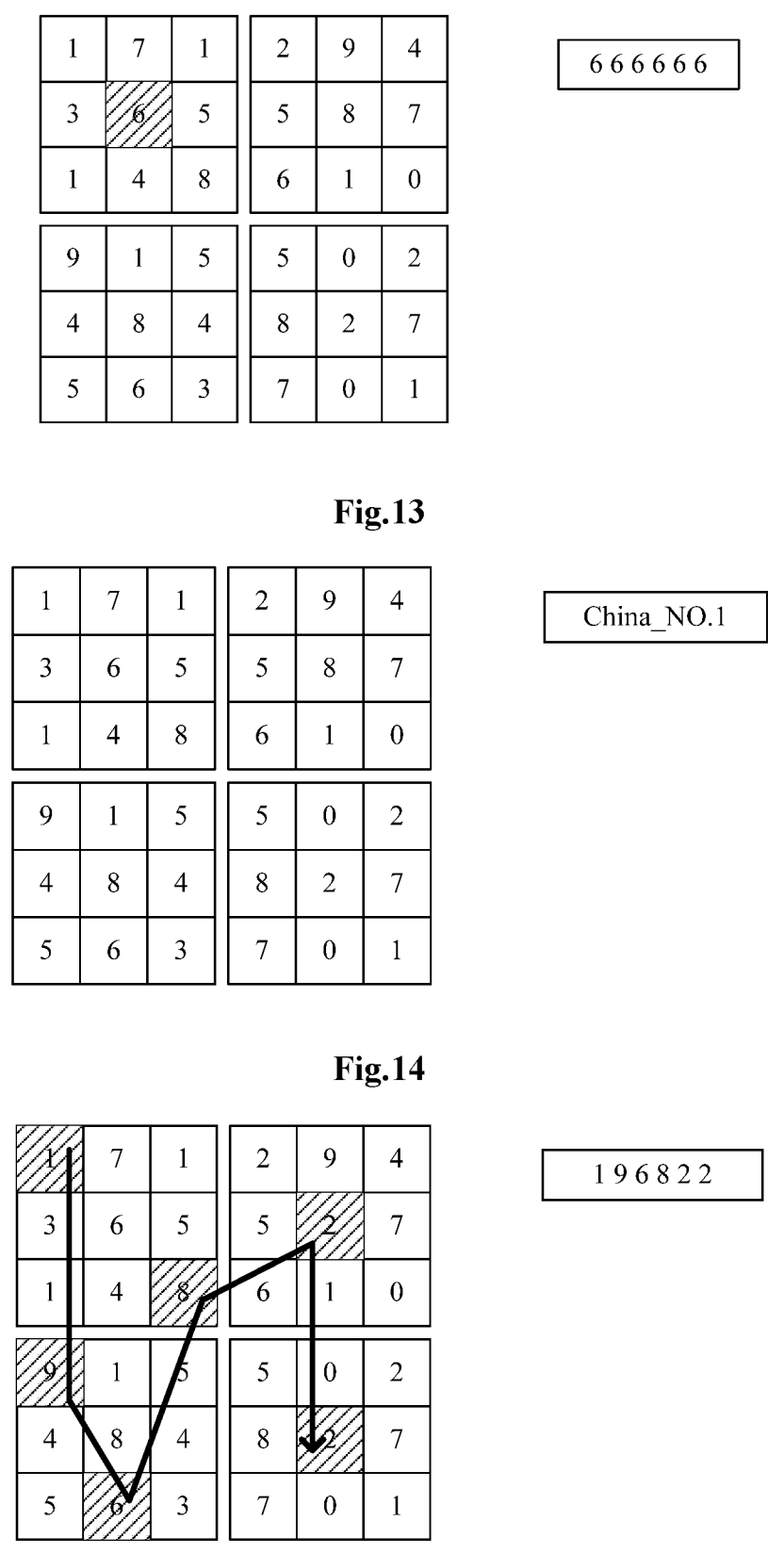

In a preferred implementation solution of the foregoing embodiment, in order to further enhance the randomness and anti-counterfeiting performance of a full-element dynamic factor table, another one-time dynamic positioning authentication method is provided according to the application. The method includes all the steps in the foregoing method embodiment, with a difference that the first positioning rule corresponding to the dynamic graphical password input by the user in step S204 includes one of combining of consecutive positioning factors, combining of non-consecutive positioning factors, combining of repeated positioning factors at the same location, and combining of fixed characters, or any combination thereof. FIG. 11 shows a (consecutive) positioning rule of combining consecutive positioning factors, where all the positioning factors are consecutive. FIG. 12A to FIG. 12C show (non-consecutive) positioning ruled of combining non-consecutive positioning factors, where positioning factors in a dynamic graphical password are inconsecutive, between which there is a hop. FIG. 13 shows a (single-point) positioning rule of combining repeated positioning factors at the same location, i.e., combining of repeated single positioning factors. FIG. 14 shows a positioning rule of combining fixed characters. As shown in FIG. 14, a dynamic graphical password includes the fixed characters "China_NO. 1" preset by the user. In addition, the positioning rule further includes combining of distributed positioning factors, as shown in FIG. 15A and FIG. 15B. The dynamic graphical password may also be based on a combination of one or more of the positioning rules above. For example, as shown in FIG. 16, the dynamic graphical password is a combination of consecutive positioning factors, non-consecutive positioning factors, and fixed characters, which is "168 China 431 NO. 1" upon combination.

The positioning factor includes an English letter, a word, a Chinese character, a numeral, a symbol, an image, a color, etc. In addition, each positioning factor in a full-element dynamic factor table may be one or more characters. Each factor may be a character from 0 to 9, two characters from 10 to 99, or three characters from AIU to EGF. As the characters are the more, the password has the higher complexity and is more hard to crack.

In the one-time dynamic positioning authentication method provided according to this embodiment, the types of positioning factors in a positioning factor library include: English letter, word, Chinese character, numeral, symbol, image, color, etc., which improves the randomness and anti-counterfeiting performance of the full-element dynamic factor table. The dynamic graphical password set by the user includes a combination of consecutive positioning factors, a combination of non-consecutive positioning factors, a repetition of positioning factors at the same location, conventional fixed characters, and any combination thereof. Therefore, the flexibility and diversification of the dynamic graphical password are further enhanced, and the dynamic graphical password has a low repetition rate and an increased complexity, making it more hard to crack the input dynamic graphical password.

In addition, in order to further enhance the complexity and anti-counterfeiting performance of the dynamic graphical password, the positioning rule input by the user based on the full-element dynamic factor table or the first positioning rule includes an action mechanism when the user sets a password based on the full-element dynamic factor table. The rule obtained through parsing in view of the action mechanism includes the following several modes:

a) single-point mode, in which a point at the same location or one point is repeatedly selected (as shown in FIG. 13);

b) distributed mode, in which all positioning points in the full-element dynamic factor table are distributed (as shown in FIG. 15A and FIG. 15B);

c) consecutive mode, in which all points of positioning factors are consecutive (as shown in FIG. 11);

d) non-consecutive mode, in which most of the positioning points are consecutive, and the positioning points also include non-consecutive points (as shown in FIG. 12A, FIG. 12B, and FIG. 12C);

e) fixed characters (the character may be a Chinese character, a numeral, a symbol, or the like), in which no point in the full-element dynamic factor table is selected, and conventional fixed characters are directly input (as shown in FIG. 14); and f) any combination of the modes above, in which the rules above may be freely combined for use (as shown in FIG. 16).

The full-element dynamic factor table provided according to this embodiment includes a structure of outer table shape and a structure of inner table shape, and the structure of the full-element dynamic factor table may change depending on a user requirement. In addition, because not only the shape structures of a plurality of inner tables but also the positioning factors in each inner table are changeable, a different full-element dynamic factor table is displayed each time a dynamic graphical password is input. Accordingly, the input of the password does not need deliberately blocking, and is immune against peep. Even if the dynamic graphical password is intercepted, the positioning rule still cannot be cracked according to the intercepted dynamic graphical password, and thus user information cannot be obtained.

In a preferred technical solution of the foregoing embodiment, in order to further enhance the anti-counterfeiting performance of the dynamic graphical password, the method further includes that the client and the server negotiates an identification rule of the inner table, or a change rule of distribution of the inner table in the outer table. The distribution change rule of the inner table includes a clockwise change rule, a counterclockwise change rule, or a random change rule. In this embodiment, another one-time authentication manner is provided, which is defined as a full-element-mode authentication manner. As compared with single-element-mode authentication, the full-element mode is characterized in that not only do the positioning factors in a full-element dynamic factor table change every time being displayed, but an order of inner tables changes as well. The change includes a clockwise change, a counterclockwise change, or a random change.

Moreover, these change manners of inner tables are included in the generated information, and accordingly, step S203 specifically includes mapping the positioning factor string into the full-element dynamic factor table based on these change manners.

Figure 18:
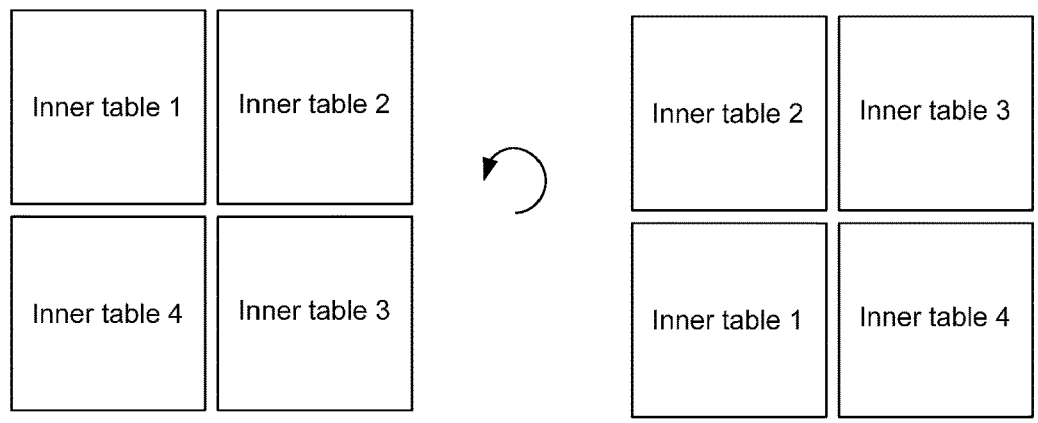
FIG. 18 is a schematic diagram illustrating counterclockwise rotation change of an inner table in a full-element dynamic factor table according to an embodiment of the present application.
Figure 19:
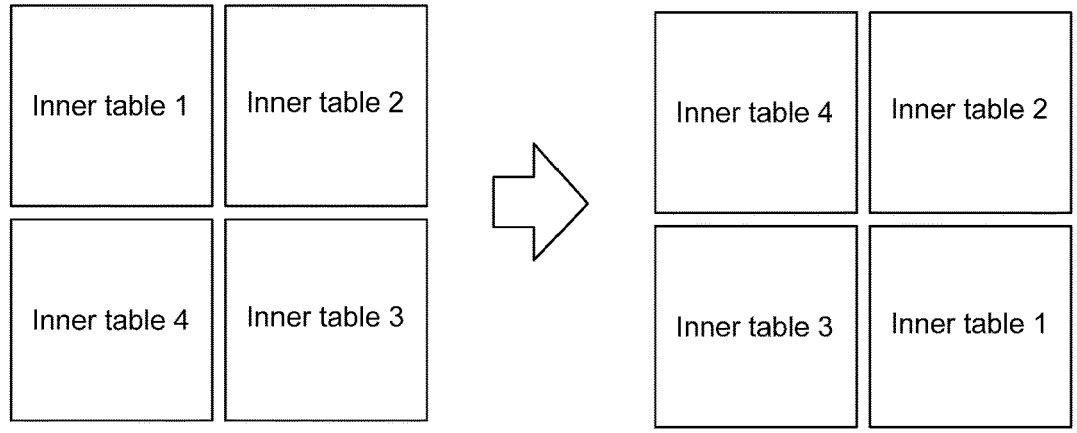
FIG. 19 is a schematic diagram illustrating random rotation change of an inner table in a full-element dynamic factor table according to an embodiment of the present application.

As shown in FIG. 17 to FIG. 19, FIG. 17 is a schematic diagram illustrating clockwise change of inner tables in a full-element dynamic factor table as preset; FIG. 18 is a schematic diagram illustrating counterclockwise change of four inner tables in the full-element dynamic factor table as preset; and FIG. 19 is a schematic diagram illustrating random change of inner tables in the full-element dynamic factor table. Moreover, the change manner of the inner tables is determined by the authentication server based on a preset algorithm.

The rotation change manner of the inner tables is preset in a system or is autonomously set by the user when setting the dynamic graphical password. During authentication, the inner tables do not change by default, and if the inner tables change, the user is provided with a prompt in the following manner.

Background color prompt: each inner table is allocated one background color, and thus can be differentiated from another by the background color. The original color order of the inner tables is indicated to the user on the client through characters, English words, or color blocks.

Figure 20A:
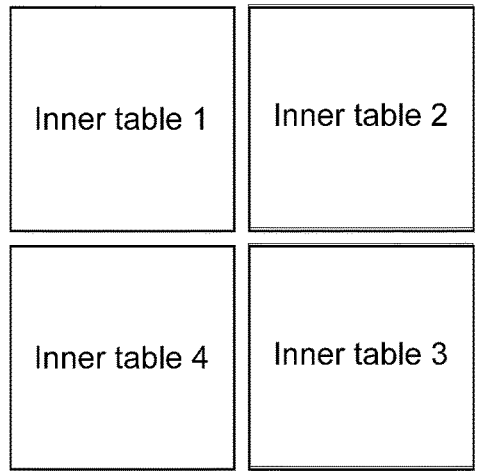
Figure 22:
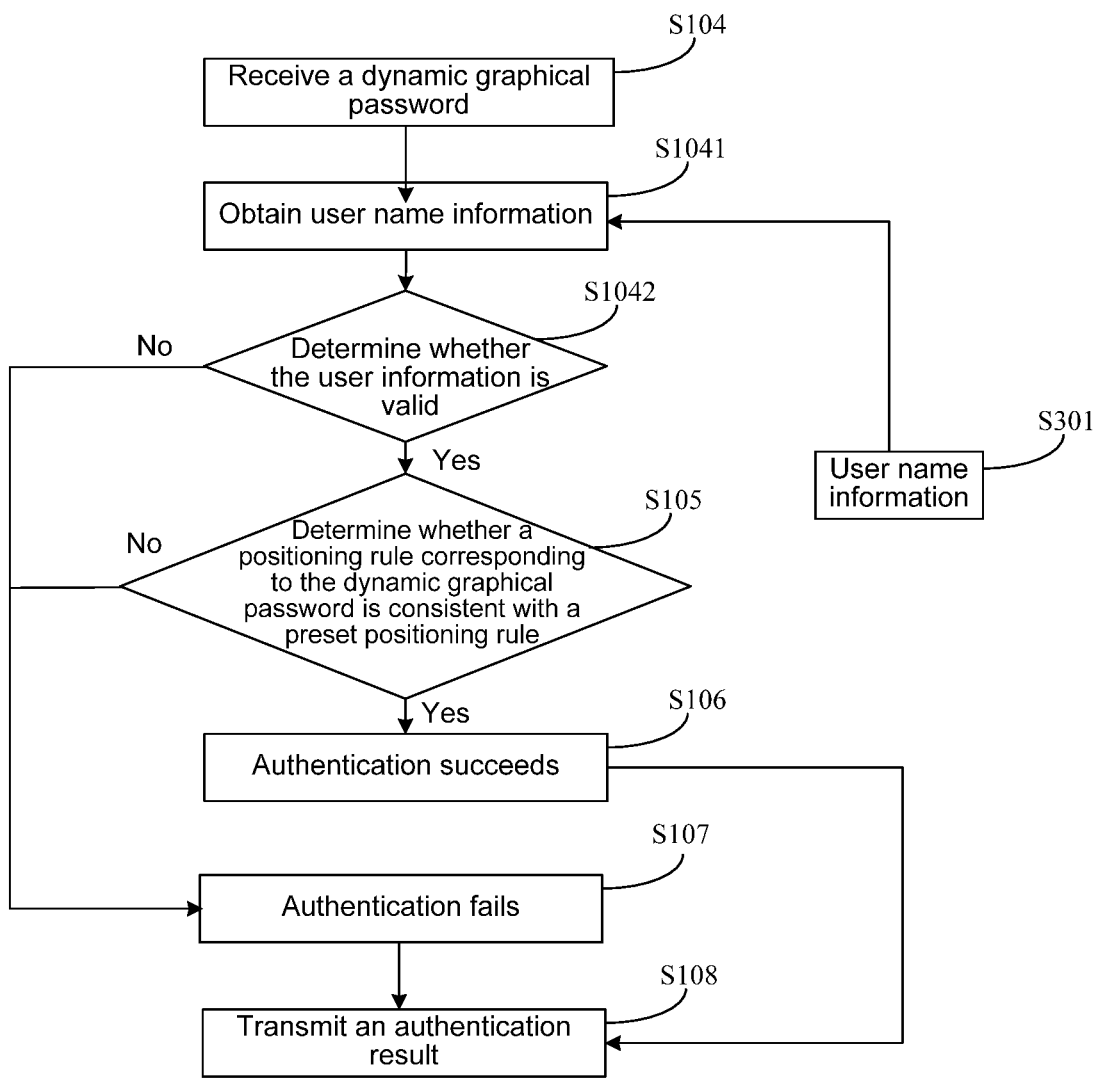
FIG. 22 is a partial flowchart of another one-time dynamic positioning authentication method according to an embodiment of the present application.

Background identifier prompt: one semi-transparent digital identifier (e.g., a numeral, an English letter, or a Chinese character) is provided in the background of each inner table. During authentication, when on the client changes, the order of the inner tables can be identified by the user based on the identifiers in the background of the inner tables. FIG. 20A shows an inner table form in an original mode. FIG. 20B shows an inner table form displayed on the client after random change.

The change/rotation manner is preset in the system. The foregoing manners are merely exemplary manners, and during actual application, there are other change manners.

During authentication, it is used as an authentication criterion by the authentication server whether the positioning rule in the inner tables is the same as the positioning rule prestored in a database.

The authentication method in the another authentication manner (full-element mode) is exemplified below. As shown in FIG. 21A and FIG. 21B, when a password is set the first time by the user, the set password positioning rule is the graphic illustrated in FIG. 21A, and the distribution of the positioning rule involves three points in inner table 1 and three points in inner table 3. During authentication, the order of the four inner tables changes counterclockwise, and the authentication succeeds only when a dynamic graphical password input by the user can ensure that the point rule in each inner table is correct. As shown in FIG. 21B, the client indicates an original color distribution to the user through color blocks. The inner table 1 is located at the lower left corner of the full-element dynamic factor table after counterclockwise change, and thus a password to be input is the positioning rule in inner table 1 during password setting. Likewise, inner table 3 is located at the upper right corner after counterclockwise change, and thus a password to be input is the positioning rule in the inner table 3 during password setting.

In the full-element-mode authentication method provided according to this embodiment, the inner tables in the full-element dynamic factor table change in form. For the dynamic graphical password input by the user each time, the graphic not only changes itself, but also corresponds to different elements. The authentication fails once the positioning rule obtained by the authentication server through parsing the dynamic graphical password is different from the preset positioning rule, which improves the security of the dynamic graphical password, and increases the difficulty in password cracking.

In another preferred embodiment, the authentication request includes a user ID, and the authentication server may determine a structure of a full-element dynamic factor table corresponding to the user based on the user ID. For example, the user ID includes information such as a positioning factor type, a preference of the user, and the like, and the authentication server determines the structure of the full-element dynamic factor table corresponding to the user based on the information.

In addition, the authentication server uses a uniform a full-element dynamic factor table after receiving the authentication request transmitted by the client. Such a manner of directly fetching a uniform structure of full-element dynamic factor table from the authentication server is defined as a system-level setting manner, where a same full-element dynamic factor table form is used by all users. During authentication in this mode, the authentication request transmitted to the authentication server does not need to include other information, which can reduce the time required for authentication, increase the authentication efficiency, and achieve the effective harmonization of security and convenience of identity authentication.

In another preferred embodiment, after step S104, the method further includes the following steps:

Step S1041: User information is obtained. The user name information includes a user ID, a user name, an account, and other personal information of the user, e.g. a personal avatar. In addition, the authentication server may obtain from the client, or directly fetch from the database, the user information of the current user.

Step S1042: It is determined whether the user information is valid, specifically it is determined whether the user ID or the user name is in existence. If the user ID or the user name is in existence, the user information is authenticated as valid, and the process proceeds to step S105. If the user ID or the user name is not in existence, it indicates that the user information of the user does not exist in the database and thus the user information is invalid, the process directly skips to step S107, and the authentication fails.

In a preferred implementation, step S104 further includes: The authentication server may simultaneously obtain the user information and the dynamic graphical password, so as to reduce the time required for authentication, and increase the authentication efficiency.

Step S1042 may change order with step S105, i.e., it is firstly determined whether the positioning rule of the user is the same as the preset positioning rule, and then it is determined whether the user information is valid, the specific determining process is the same as that in the foregoing embodiment, and the details thereof are not described repeatedly herein.

In a preferred embodiment, the method further includes: The authentication server obtains user name information of the user, where the user name information is the same as the dynamic graphical password input by the user. The authentication server may obtain the user name information of the user from the client or the database.

The user name information includes a unique identifier, such as a user name, an account number, a user ID, or a login ID, of the user in the system. The user uses a positioning graphic as a user name, but a conventional password is still used as the password. In this way, it is not only that the user can retain an original use habit, i.e., still using a conventional password, but also that the security of user information can be enhanced, because the user name is a positioning graphic, which has high security, is hard to guess and crack, is easy to remember, and is immune against peep, although the password is still a conventional password, which is easy to crack. Because the user name is in the form of a positioning graphic, which is hard to crack, even if the password is leaked, the cracker cannot log into an Internet application, and thus the information of the user will not be lost, which provides a higher security.

The present application further discloses another one-time dynamic positioning authentication method, involving a client and a server. The method includes:

The client is configured to generate a positioning factor string based on positioning factors selected from a positioning factor library, generate a full-element dynamic factor table based on a structure of a full-element dynamic factor table, and map the positioning factor string into the full-element dynamic factor table. The client further includes a positioning factor library, where the positioning factor library is configured to store positioning factors; and further includes a memory, where the memory is configured to store the full-element dynamic factor table, and parameter information (a structure, etc.) for generating the full-element dynamic factor table. The positioning factor library may be stored in a database or an attribute file of the client.

The client is further configured to obtain a dynamic graphical password input by a user according to a first positioning rule, and transmit the dynamic graphical password to an authentication server, where the dynamic graphical password is formed by positioning factors in the full-element dynamic factor table according to the first positioning rule.

The authentication server is configured to receive the dynamic graphical password from the client, parse the dynamic graphical password, if the first positioning rule obtained through parsing and corresponding to the dynamic graphical password is consistent with a preset positioning rule, determine that the authentication succeeds; or otherwise, determine that the authentication fails; and transmit an authentication success or failure result to the client.

In this embodiment, the generating a positioning factor string based on positioning factors selected from a positioning factor library includes:

obtaining positioning factors selected by the current user and the total number of positioning factors included in the full-element dynamic factor table;

determining the total number of positioning factors based on the selected positioning factors and the full-element dynamic factor table; and generating the positioning factor string by randomly arranging and combining the positioning factors in the full-element dynamic factor table, where one positioning factor in the positioning factor string appears at least twice, which makes the positioning factor string possess randomness and uniqueness, increases the complexity of the positioning factor string, and further improves the anti-counterfeiting performance and security of the dynamic graphical password.

In addition, the foregoing embodiment is merely an implementable manner of selecting positioning factors from a positioning factor library, which may also be implemented in other manners. For example, positioning factors are determined through a special encryption algorithm, the user autonomously selects positioning factors, or a system randomly selects positioning factors.

In addition, in order to further enhance the complexity and anti-counterfeiting performance of the dynamic graphical password, the first positioning rule obtained through parsing the dynamic graphical password input by the user includes one of combining of consecutive positioning factors, combining of non-consecutive positioning factors, combining of repeating positioning factors at a same location, and combining of fixed characters, or any combination thereof.

In the embodiment of the authentication method, the types, change manners, and features of the positioning factor string, the full-element dynamic factor table, and the dynamic graphical password are the same as those in the foregoing embodiment, the difference from which is that the client, in the method, has functions of selecting positioning factors, generating a positioning factor string, and mapping the positioning factor string into a full-element dynamic factor table, so that the step of the user transmitting an authentication request to the authentication server is omitted, the time required for authentication is saved, the authentication efficiency is increased, and the effective harmonization of security and convenience of identity authentication is achieved.

Figure 23:
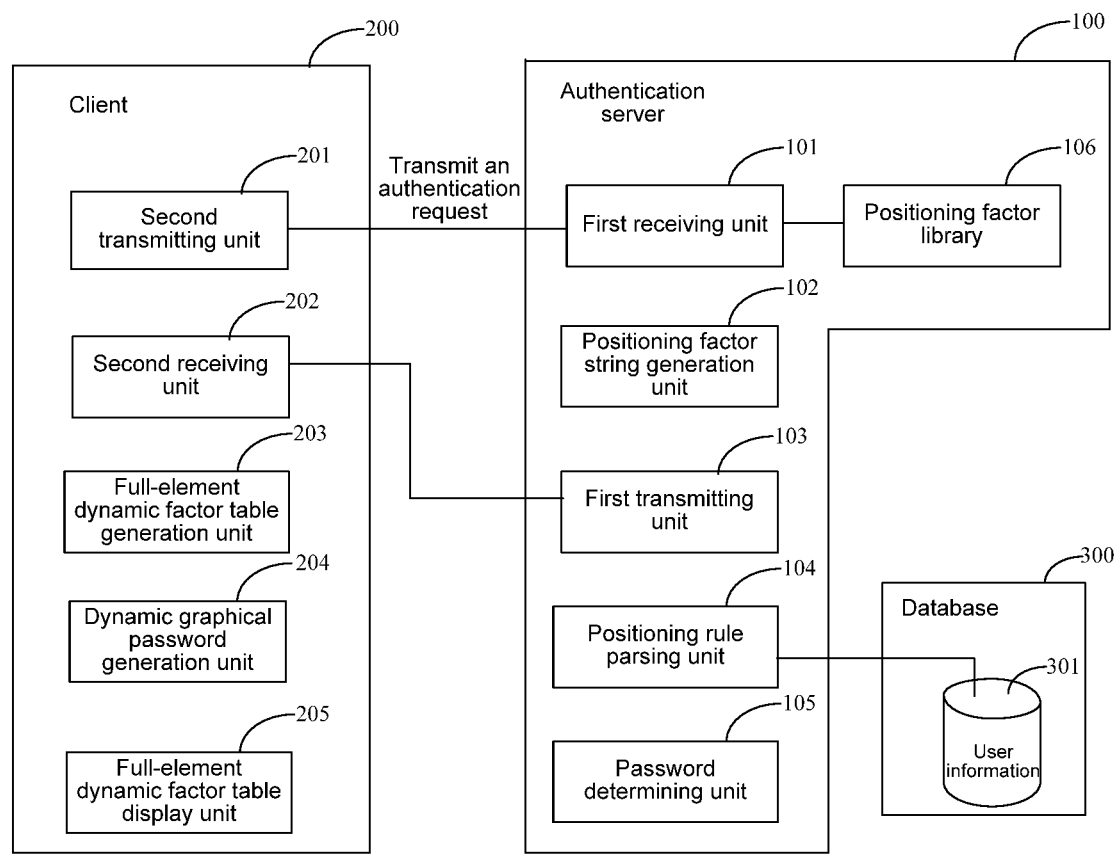
FIG. 23 is a structural block diagram illustrating a one-time dynamic positioning authentication system according to an embodiment of the present application.

Corresponding to the foregoing method embodiment, the present application further discloses a one-time dynamic positioning authentication system, including: at least one authentication server 100 providing authentication service for a user, at least one client 200 providing network login and access for the user, and a database 300, as shown in FIG. 23.

The authentication server 100 includes: a first receiving unit 101 configured to receive information from the client, a first transmitting unit 103 configured to transmit information to the client, and a positioning factor string generation unit 102, a positioning rule parsing unit 104, and a password determining unit 105 that are connected to the first receiving unit and the first transmitting unit.

The positioning factor string generation unit 102 is configured to generate a positioning factor string based on positioning factors selected from a positioning factor library 106. The first transmitting unit 103 is configured to transmit generated information including the positioning factor string and a structure of the full-element dynamic factor table to the client 200. The positioning rule parsing unit is configured to receive a dynamic graphical password input by a user according to a first positioning rule, and obtain, through parsing, the first positioning rule corresponding to the dynamic graphical password.

The password determining unit 105 is configured to determine whether the first positioning rule is consistent with a preset positioning rule, and transmit a determining result to the client through the first transmitting unit.

The client 200 includes: a second receiving unit 202 configured to receive information from the authentication server, a second transmitting unit 201 configured to transmit information to the authentication server, and a full-element dynamic factor table display unit 205 and a dynamic graphical password generation unit 204 that are connected to the second receiving unit 202 and the second transmitting unit 201.

The full-element dynamic factor table display unit 205 is configured to map the positioning factor string into a full-element dynamic factor table. The dynamic graphical password generation unit 204 is configured to generate the dynamic graphical password based on the input of the user in the full-element dynamic factor table according to the first positioning rule, and transmit the dynamic graphical password to the authentication server 100 through the second transmitting unit 201.

The database 300 may be integrated in the authentication server 100, and the database includes the positioning factor library 106 as well. The positioning factor library includes a set of elements (positioning factors) for generating the full-element dynamic factor table. The positioning factors are of different types, such as English letter, word, Chinese character, numeral, symbol, and the like. Positioning factors of one or more types are selected from the positioning factor library as the positioning factors for generating the positioning factor string.

In addition, the positioning factor string, the positioning factor library, the full-element dynamic factor table, and the positioning rule in the embodiment of the system are the same as those in the embodiment of the foregoing method, and the details thereof are not described repeatedly herein.

It should be noted that the client and the authentication server in this embodiment may be integrated in one device or apparatus, or two different devices or apparatuses.

If the functions of the client and the server are integrated in one device or apparatus, e.g., a stand-alone PC or mobile terminal, an offline mode or mechanism is formed, in which the terminal such as the device or the apparatus itself can independently perform authentication independent of network communication. In this case, the terminal in the system includes: an authentication server unit, a client unit, and a database unit. Moreover, the authentication server unit, the client unit, and the database unit have the same functions as the authentication server 100, the client 200, and the database 300, respectively.

Figure 24:
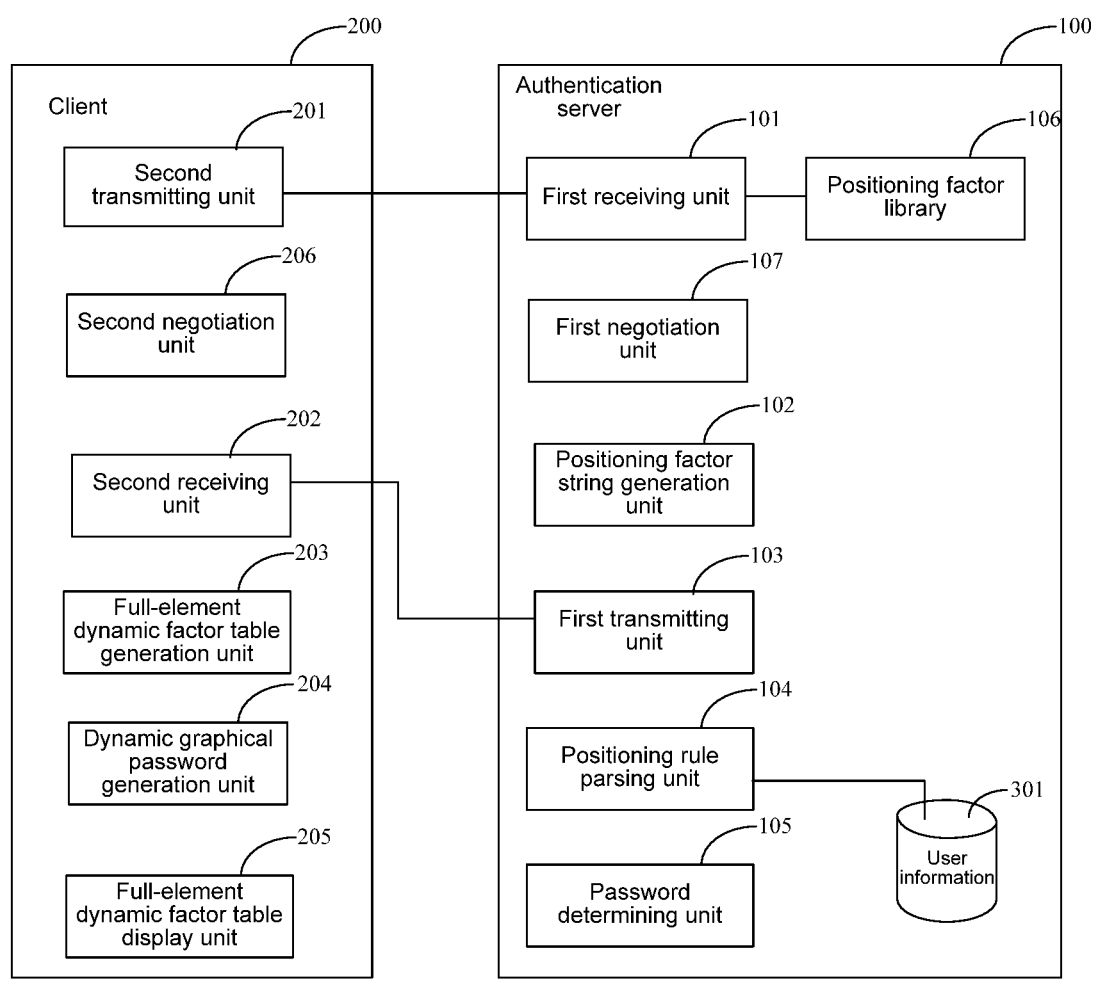
FIG. 24 is a structural block diagram illustrating another one-time dynamic positioning authentication system according to an embodiment of the present application.

In this embodiment, as shown in FIG. 24, between the first receiving unit 101 and the first transmitting unit 102, the server further includes a first negotiation unit 107 configured to negotiate the structure of the full-element dynamic factor table with the client; and between the second receiving unit 202 and the second transmitting unit 201, the client further includes a second negotiation unit 206 configured to negotiate the structure of the full-element dynamic factor table with the server.

The first negotiation unit 107 is configured to negotiate, with the second negotiation unit 206, an outer table structure and an inner table structure of the full-element dynamic factor table, a difficulty coefficient of an inner table, a positioning factor type, a combination mode of the positioning factor strings, etc. The second negotiation unit 206 is configured to cooperate with the first negotiation unit 107 to achieve personalization and diversification of the client during user registration, thereby enhancing the uniqueness of the dynamic graphical password for user authentication, increasing the recognition degree of individuals, and further enhancing the anti-counterfeiting function.

In addition, in this system, the authentication server further includes a user name information obtaining unit, a user name information determining unit, a user name information determining result generation unit, and a storage unit. The user name information includes a user ID, a user name, an account, and other personal information of the user, e.g. a personal avatar. The user name information obtaining unit is configured to obtain the user name information, where the user name information may be fetched from the database or obtained from the current client. The user name information determining unit is configured to determine whether the user name information is valid, i.e., whether the obtained user name is in existence, and if the user name is in existence, determine that the user name information is valid; otherwise, determine that the user name information is invalid. The user name information determining result generation unit is configured to generate a determining result, i.e., the user name information is valid or invalid, according to the determination of the user name information determining unit, and transmit the determining result to the corresponding client through the first transmitting unit.

There is no restriction on the determining order between the password determining unit and the user name information determining unit.

In The present application, combining the concepts of "OTP" (One-Time Password) which has a high security and "graphical password" which is easy to remember, an authentication mode is provided, in which positioning factors are mapped into a randomly generated array table, and then positioning information in the array table is used as a password is provided. This authentication mode achieves a perfect harmonization of extremely high security and strong memorability independent of any other external encryption device.

In the one-time dynamic positioning authentication system provided according to The present application, instead of conventional complex numerals, letters, or symbols, a "positioning graphic", which is formed by corresponding locations of "positioning factors" mapped in the full-element dynamic factor table and an order therebetween, is used by the dynamic graphical password generated in the system as an authentication password. The security and anti-counterfeiting performance of user identity authentication are greatly improved while the convenience and interestingness are improved as compared to conventional password operations.

In addition, the system overcomes the defects of conventional passwords that the passwords are not easy to remember, and are also "easy to leak", "easy to guess", "easy to intercept", and "easy to crack" at once, and is fundamentally free from long-term dependence on an external encryption device, e.g. a token, during authentication and encryption. The "cross-platform and full-media" interconnection and intercommunication of an authentication technology is actually achieved with full consideration of objective requirements of big data concurrency applications.

The system further includes: a load balancer connected to the authentication server, and the load balancer is configured to determine whether a load of received authentication requests is greater than a set load threshold, and allocate a last received authentication request to another authentication server if the load is greater than the set load threshold.

Figure 25:
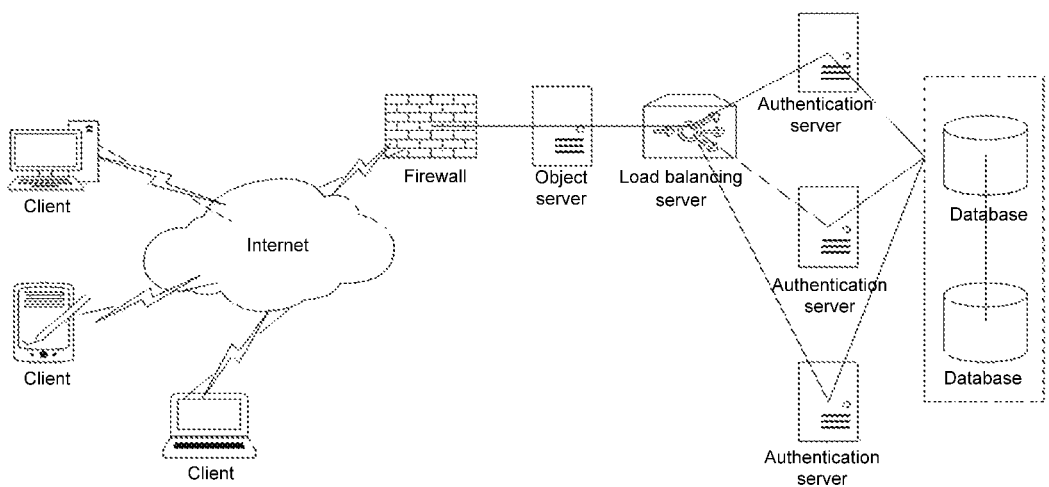
FIG. 25 is a schematic structural diagram illustrating a one-time dynamic positioning authentication system for a large amount of access data according to an embodiment of the present application.

When an object system is accessed by a large amount of data, the system is under too much pressure for authentication, causing a big data concurrency problem, such as network congestion. As a result, before yet the object system functions, some authentication servers have even broken down. The system provided according to the present application can serve as an authentication role in the object system, so as to reduce the authentication pressure of the object system. In a big data concurrency scenario, the dynamic graphical authentication system can add or delete an authentication server and a database freely depending on a user need. FIG. 25 is a conceptual diagram illustrating a network construction of an embodiment of an object system accessed by a large amount of data In a specific embodiment, a client 04 transmits an authentication request to an object system, and the request is transmitted to a load balancing server 05 through the object system. The load balancing server 05 allocates the authentication request to an authentication server 01 in a balanced manner. The authentication server 01 generates a dynamic factor string, and transmits the dynamic factor string to the client 04 through the object system 03. The client 04 maps the dynamic factor string into a full-element dynamic factor table after receiving the dynamic factor string. A user inputs a dynamic graphical password according to a defined positioning rule, and the client 04 transmits the dynamic graphical password to the object system 03. The object system 03 allocates the dynamic graphical password to the authentication server 01 through the load balancing server 05. The authentication server 01 parses the password to obtain a positioning rule, and compares the positioning rule with the positioning rule of the current user fetched from a database 02, and determines that the authentication succeeds if the two positioning rules are the same; or determines that the authentication fails if the two positioning rules are different.

In addition, the dynamic graphical authentication system provided according to this embodiment can also be deployed in any system of a BS or CS type and act as an authentication role. The dynamic graphical authentication system can co-exist and used with any prior authentication system and authentication method, or replace a prior authentication scheme of a system. Desired compatibility is achieved, and users can conveniently operate when the system is set up.

Information transmission between systems is performed in a manner of separating data from table. The authentication server generates a positioning factor string, and the client maps the positioning factor string into a full-element dynamic factor table. Communication transmission in the entire system is based on encrypted SSL communication, and data in the DB is stored in an encrypted manner, which improves the system security.

The present application further provides a one-time dynamic password alteration method, and the method includes the following steps:

Step 10: An authentication server obtains a password alteration request and a pre-alteration password from a client.

Step 20: The authentication server generates two positioning factor strings based on a full-element dynamic factor table, and transmits the two positioning factor strings to the client at one time.

Step 30: The client receives the two positioning factor strings, maps the two positioning factor strings into full-element dynamic factor tables, respectively, obtains a first dynamic graphical password input by a user, from a first full-element dynamic factor table according to a first positioning rule and a second dynamic graphical password input by the user, from a second full-element dynamic factor table according to a second positioning rule, respectively, and transmits the first dynamic graphical password and the second dynamic graphical password as password alteration information to the authentication server.

Step 40: The authentication server receives the two dynamic graphical passwords from the client, parses the received two dynamic graphical passwords, determines whether to perform a password alteration operation, if the positioning rules, obtained through parsing, corresponding to the two dynamic graphical passwords, are the same, determines that password alteration succeeds, and logs the new positioning rule as a password into a database, or if the positioning rules corresponding to the two dynamic graphical passwords are different, determines that a new password is not logged, and that password alteration fails; and transmits a password alteration success or failure result to the client.

Step 50: The client receives the password alteration success or failure result transmitted by the authentication server.

In this embodiment, the positioning factor string, the positioning factor library, the full-element dynamic factor table, and the positioning rule are the same as those in the embodiment of the foregoing one-time dynamic positioning authentication method; the structure of the full-element dynamic factor table, the change of inner tables, and the positioning rule type are also the same as those described above, and details thereof are not described repeatedly herein.

A difference from the foregoing embodiment of the one-time dynamic positioning authentication method is that the client needs to output two dynamic graphical passwords in step 30. Correspondingly, the authentication server generates two positioning factor strings, and transmits the two positioning factor strings to the client. The two full-element dynamic factor tables, in which the two positioning factor strings have mapped, respectively, are different from each other. Password alteration succeeds only when the authentication server determines that the two positioning rules are the same. Because the full-element dynamic factor tables corresponding to the input of the two dynamic graphical passwords are different, the two dynamic graphical passwords are also different. As a result, the dynamic graphic password will not be cracked even when stolen or intercepted. Compared with prior password alteration methods, the password alteration method provided according to this embodiment has higher security and reliability, and the risk of a password being stolen or intercepted is greatly reduced.

In another preferred implementation, obtaining, by the authentication server, the pre-alteration password, the first dynamic graphical password, and the second dynamic graphical password in step 10 includes:

Step 11: The authentication server firstly obtains the pre-alteration password from the client, and if the pre-alteration password is the same as a preset password, then obtains the first dynamic graphical password and the second dynamic graphical password; or otherwise, determines that password alteration fails, or proceeds to step 12.

Step 12: The authentication server simultaneously obtains the pre-alteration password, the first dynamic graphical password, and the second dynamic graphical password from the client, and parses the three passwords to obtain positioning rules corresponding to the three passwords. The authentication server firstly verifies whether the current password is correct based on user name information or a user ID, and a current dynamic graphical password. If the current password is correct, the authentication server parses the two new dynamic graphical passwords, and then if the positioning rules are the same, logs the new positioning rule in the database, so as to complete password alteration.

In this embodiment, the authentication server obtains the pre-alteration password, the first dynamic graphical password, and the second dynamic graphical password in stages or simultaneously, which may be determined based on the actual load of a password alteration system. When the load on the system is heavy, the authentication server may obtain the passwords in stages, so as to reduce the computing intensity per unit time, thereby reducing the system pressure. If the load on the system is light, the authentication server may simultaneously obtain the passwords and complete corresponding parsing and alteration determining steps, so as to save time for the user, and improve the password alteration efficiency.

In addition, in step 30, the dynamic graphical password is used as a user name, i.e., the user name is the same as the dynamic graphical password. The user name includes an appellation of a unique identifier, such as an input user name, an account, a user ID, a login ID, and the like, of the user in the system. A dynamic graphic is used by the user as a user name, but a conventional password is still used as a password. In this way, it is not only that the user can retain an original use habit, i.e., still using a conventional password, but also that the security of user information can be enhanced, because the user name is a dynamic graphic, which has high security, is hard to guess and crack, is easy to remember, and is not afraid of peeping, although the password is still a conventional password. Even if the password is leaked, the cracker cannot log into an Internet application by using the user identity, the information of the user will not be lost, and thus the security of identity authentication is effectively ensured.

As seen from the foregoing embodiments, the one-time dynamic positioning authentication method and system and password alteration method provided according to the present application further have beneficial effects as follows:

1. The dynamic graphical password is independent of hardware and plug-ins:

Because the user inputs a dynamic graphical password based on a full-element dynamic factor table displayed on the client, password generation is independent of hardware (e.g., a mobile phone, a base station, or hardware), so that the authentication or password alteration process is securer. Attacks launched by attackers based on a time difference in hardware transmission are avoided. In addition, it is not subjected to the restrictions resulted from the use of hardware devices (e.g. a mobile phone), such as service abnormality, weak signals, hardware loss, necessary hardware registration with a designated outlet, etc.

Independence of third-party plug-ins prevents attackers from implanting cracking tools and the like into the third-party plug-ins and thereby posing a threat to passwords. In addition, the user does not need to install a plug-in prior to refreshing operation during use, which provides not only convenience but also higher security.

2. Big data concurrency is supported:

The authentication server and the database involved in the present application can be added or deleted freely depending on requirements, and when used in conjunction with the load balancing server, they can relieve the pressure on an authentication module of an object server in the situation that there is a large amount of data access.

3. Broad applicability and cross-platform and full-media support are achieved:

The system has a flexible access manner. To be specific, the system can "replace" an existing user authentication system at one time, or co-exist with the existing user authentication system by connecting to the user authentication system in a supplemental authentication manner.

This authentication manner and server can be grafted on to any terminal for use, which breaks through the application restrictions on various terminals such as PC, tablet PC, smartphone, and the like, thereby achieving "cross-platform and full-media" interconnection for authentication in fact.

4. It is economical and environmentally protective.

The system is independent of any hardware, and the number of users can be increased or decreased depending on actual needs. Therefore, hardware purchase, maintenance, expiration, and other costs are saved, and the number of system users can change accordingly as the number of users increases or decreases.

In addition, independent of hardware, the authentication system provided according to the present application can be implemented without raw material consumption and carbon dioxide produced during hardware manufacturing, and a problem of hardware surplus resulting from few users.

Corresponding to the one-time dynamic positioning authentication method (referred to as a first authentication method for short below), an embodiment of the present application further provides another one-time dynamic positioning authentication method (referred to as a second authentication method for short below).

A main difference between the second authentication method and the first authentication method provided according to the embodiments of the present application is that in the second authentication method, positioning factors are selected and a positioning factor string is generated on the client, while in the first authentication method, positioning factors are selected and a positioning factor string is generated on the server.

In the first authentication method, the server needs to perform computing processing, and therefore some computing resources of the server need to be occupied. When a large number of users perform authentication, this processing manner will greatly affect the server performance. In order to resolve this problem, a second authentication method is provided according to an embodiment of the present application, wherein positioning factors are selected and a positioning factor string is generated on the client. In this processing manner, the computing resources of the client are fully utilized to share the computing tasks of the server. Therefore, the consumption of computing resources of the server can be effectively reduced, thereby improving the server performance.

Figure 26:
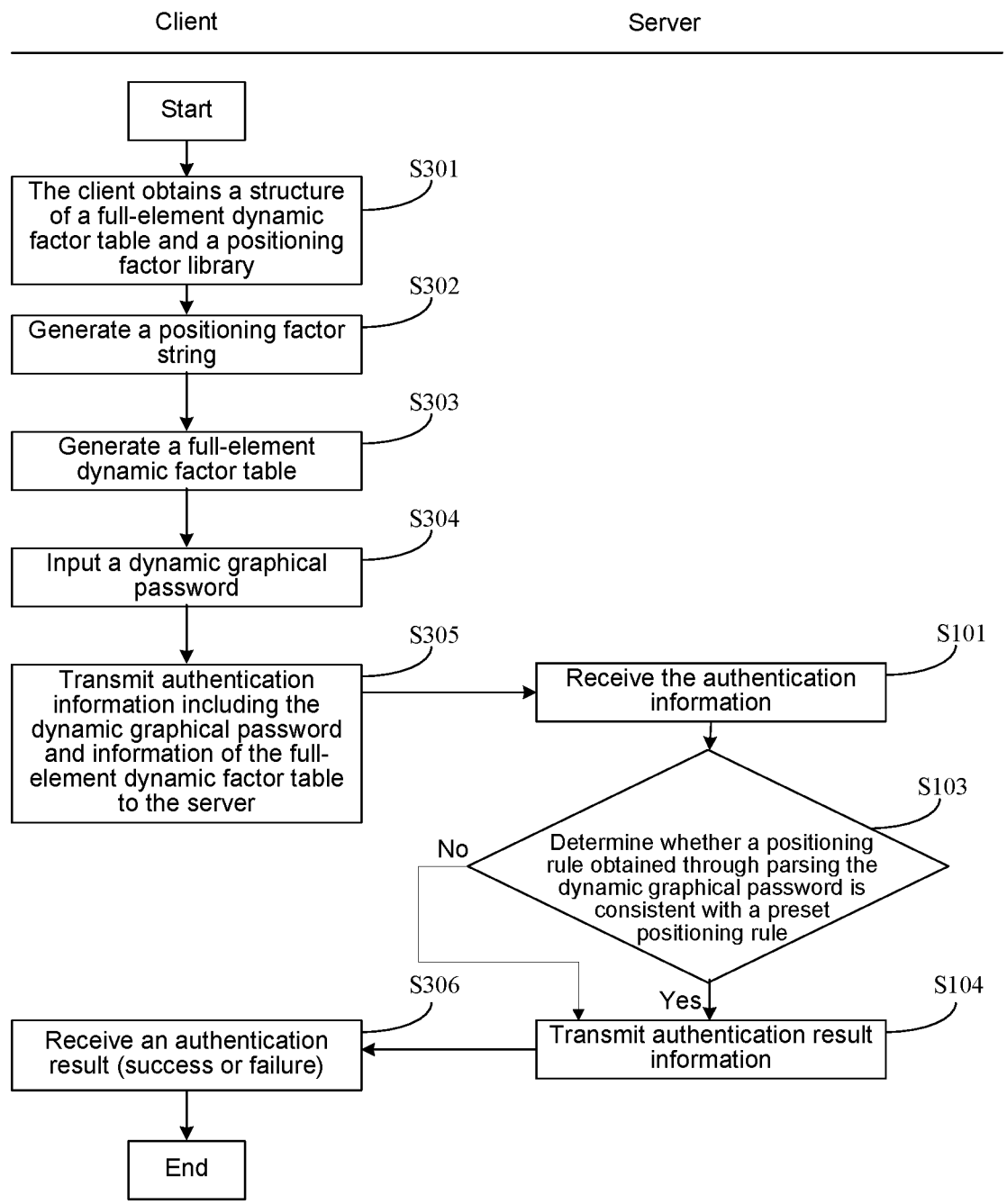
FIG. 26 is a flowchart of still another one-time dynamic positioning authentication method according to an embodiment of the present application.

FIG. 26 is a flowchart of an embodiment of the second authentication method provided according to the present application. The parts in this embodiment that are the same as those in the first embodiment are not described repeatedly, referring to the corresponding parts in the first embodiment. The second authentication method provided according to the embodiment of the present application includes the following steps:

Step S301: A client obtains a structure of a full-element dynamic factor table and a positioning factor library.

A full-element dynamic factor table is a table including a structure and content, and based on the full-element dynamic factor table, a user can input a dynamic password.

The structure of the full-element dynamic factor table includes, but not limited to, at least one of the following structures: an outer table structure (e.g., of a regular type or an irregular type), an inner table structure (e.g., of a regular type or an irregular type), the numbers of rows and columns of an inner table, etc.

The structure of the full-element dynamic factor table may be a common structure, or a user-defined structure. The common structure includes a structure common to each user in an authentication system. With the common structure, the full-element dynamic factor tables presented to all users have the same structure and are of a same positioning factor type. With the user-defined structure, the individualized full-element dynamic factor tables can be presented to different users.

The content of the full-element dynamic factor table is changeable, and therefore each element as the content may be referred to as a dynamic factor. In addition, because the password input by means of the full-element dynamic factor table is actually a positioning rule, the dynamic factor may also be referred to as a positioning factor.

The positioning factor library includes a plurality of selectable positioning factors. The positioning factor includes an English letter, a word, a Chinese character, a numeral, a symbol, an image, and/or a color.

During specific implementation, step S301 may have a plurality of implementation manners, and three selectable implementation manners are given below.

Manner 1. A common structure of the full-element dynamic factor table and a positioning factor library are obtained locally from the client.

If the structure of the full-element dynamic factor table and the positioning factor library are obtained in this manner, the structure information of the common full-element dynamic factor table and the positioning factor library need to be stored in the client in advance.

During specific implementation, the client may prestore the information about a plurality of structures of the common full-element dynamic factor table. When an authentication function is triggered, one structure may be selected from the plurality of structures by using a preset algorithm (e.g., a random selection algorithm) as a structure actually used in current authentication. Alternatively, the user who is authenticated may actively select one structure, thereby improving the user experience.

Manner 2. A structure of the common full-element dynamic factor table and a positioning factor library are obtained from a server.

Obtaining a structure of the full-element dynamic factor table and a positioning factor library in this manner, the method may include the following specific steps: 1) the client transmits an authentication request to the server; 2) the server determines the structure of the common full-element dynamic factor table and obtains the positioning factor library based on the authentication request, and transmits the structure of the full-element dynamic factor table and the positioning factor library to the client.

So far, two selectable implementation manners of step S301 have been described.

It should be noted that the above two manners have respective advantages and disadvantages. In Manner 1, because it is unnecessary to obtain the structure and the positioning factor library from the server each time, network traffic can be effectively saved, but local there may be a problem that the locally prestored information is not updated in time. In Manner 2, because the structure and the positioning factor library first need to be firstly obtained from the server during authentication each time, more network traffic needs to be consumed, but it can be ensured that the latest structure and positioning factor library are obtained. In practical application, either of the manners may be selected, depending on a specific requirement, to enable the client to obtain the structure of the full-element dynamic factor table and the positioning factor library.

Manner 3. A user-defined structure of the full-element dynamic factor table and positioning factor library are obtained from the server.

The structures obtained in Manner 1 and Manner 1 are both common structures. The function of presenting individualized full-element dynamic factor tables to different users can be achieved in Manner 3, so that the user-defined structure of the full-element dynamic factor table and positioning factor library are presented on the client.

It can be specifically implemented in the following manners: the user inputs a user name on the client, and the client transmits an authentication request to the authentication server; the authentication server receives the authentication request and a user ID, and retrieves a structure of the full-element dynamic factor table and a positioning factor type of the user based on the user ID; and the authentication server transmits the structure of the full-element dynamic factor table and the positioning factor type (as a positioning factor library that can be used by the client) to the client.

It should be noted that the structure of the full-element dynamic factor table and the positioning factor library obtained in step S301 may be the same as the structure and positioning factor type used during user registration, or different from the structure and the positioning factor type used during user registration.

After obtaining the structure of the full-element dynamic factor table and the positioning factor library, the client may proceed to a next step, to generate two positioning factor strings.

Step S302: The positioning factors are selected from the positioning factor library based on the structure of the dynamic factor table, and a positioning factor string is generated.

Because the full-element dynamic factor table consists of the structure and the content, when the full-element dynamic factor table is transmitted between different apparatuses, the structure and the content may be separately transmitted. The content of the full-element dynamic factor table includes a plurality of dynamic factors, and a character string formed by the dynamic factors is referred to as a positioning factor string.

Step S302 is performed to select positioning factors from the positioning factor library based on the structure of the dynamic factor table obtained in the previous step, and generate a positioning factor string. The positioning factor string generated in this step may include positioning factors of multiple types, such as English letter, word, Chinese character, numeral, symbol, image, color, and the like.

As an alternative implementation manner, positioning factors of the types specified by the user can be selected based on the structure of the dynamic factor table to generate a positioning factor string. This processing manner can effectively improve the user experience.

Step S303: A full-element dynamic factor table is generated based on the positioning factor string.

The full-element dynamic factor table can be generated based on the positioning factor string and the structure of the full-element dynamic factor table.

In an alternative manner, when the positioning factor string is mapped into the full-element dynamic factor table, the display content of some particular positioning factors may be further replaced with other content. For example, the positioning factor is a word "china", and because the positioning factor has a certain length, the visual experience of the user may be affected (e.g., the visual effect is obscured) when the positioning factor is directly displayed in the dynamic factor table, thereby degrading the user experience. In this case, the long positioning factor may be replaced with a short character. For example, the actually transmitted positioning factor is "china", while A1 is displayed in the dynamic factor table. In conclusion, a mapping relationship is formed between the transmitted positioning factor and the displayed positioning factor, which further increases the difficulty in cracking a password.

Step S304: A user inputs a dynamic graphical password based on the full-element dynamic factor table that is generated based on the positioning factor string.

Step S305: Authentication information including the dynamic graphical password and information of the full-element dynamic factor table is transmitted to a server.

Because the full-element dynamic factor table for inputting of the dynamic graphical password is generated on the client, in order to enable the server to parse the dynamic graphical password to obtain a positioning rule, the authentication information, including the dynamic graphical password input by the user and the full-element dynamic factor table generated by the client, needs to be transmitted to the server.

During specific implementation, the information of the full-element dynamic factor table included in the authentication information may be of a character type (i.e., the positioning factor string corresponding to the full-element dynamic factor table), or of a picture type (i.e., a dynamic factor table graphic corresponding to the full-element dynamic factor table). In addition, the authentication information may further include information such as the user name.

It should be noted that if the structure of the full-element dynamic factor table obtained in step S301 is different from the structure used during user registration, the authentication information may further include a location identifier of a start location in a dynamic factor table. For example, the structure of the full-element dynamic factor table is a 6*6 regular structure (i.e., 6 rows and 6 columns) during registration, while it becomes a 9*9 structure (i.e., 9 rows and 9 columns) during authentication. In this case, the 4th row and the 4th column may be used as the location identifier of the start location in the dynamic factor table, which is transmitted to the server, and the server will parse the dynamic graphical password based on a dynamic factor table formed by the locations below the start location. In this processing manner, the structure of the dynamic factor table is changed, so that the complexity of the dynamic factor table is increased, and therefore the password cracking difficulty can be effectively increased.

As an alternative solution, the positioning rule corresponding to the dynamic graphical password actually input by the user during authentication may be different from the positioning rule used during registration. To be specific, the user may input the dynamic graphical password during authentication according to an agreed change manner. For example, an agreed input change manner may be: inputting the dynamic graphical password during authentication in a manner of being horizontally symmetric or vertically symmetric with the positioning rule. In this case, the server needs to obtain the agreed input change manner, to obtain a proper positioning rule through parsing of the received dynamic graphical password.

Step S101: A server receives authentication information transmitted by a client.

Step S103: The server determines whether a positioning rule obtained through parsing of the dynamic graphical password in the authentication information is consistent with a preset positioning rule.

Different from the first authentication method, in the second authentication method, the server parses the dynamic graphical password based on the full-element dynamic factor table transferred from the client, to obtain the positioning rule corresponding to the dynamic graphical password. If the positioning rule obtained through parsing, corresponding to the dynamic graphical password, is consistent with the preset positioning rule, authentication succeeds. If the positioning rule obtained through parsing of the dynamic graphical password is inconsistent with the preset positioning rule, user authentication fails.

It should be noted that if the user inputs the dynamic graphical password according to the agreed change manner (e.g., the manner of being horizontally symmetric or vertically symmetric with the positioning rule), the server may first parse the dynamic graphical password based on the full-element dynamic factor table transferred from the client, to obtain a first positioning rule corresponding to the dynamic graphical password, and then parses the first positioning rule into a second positioning rule according to the agreed input change manner. If the second positioning rule is consistent with the preset positioning rule, authentication succeeds.

Step S104: An authentication result information is transmitted to the client.

Corresponding to the embodiment of the another one-time dynamic positioning authentication method, an embodiment of the present disclosure further provides another one-time dynamic positioning authentication system.

Figure 27:
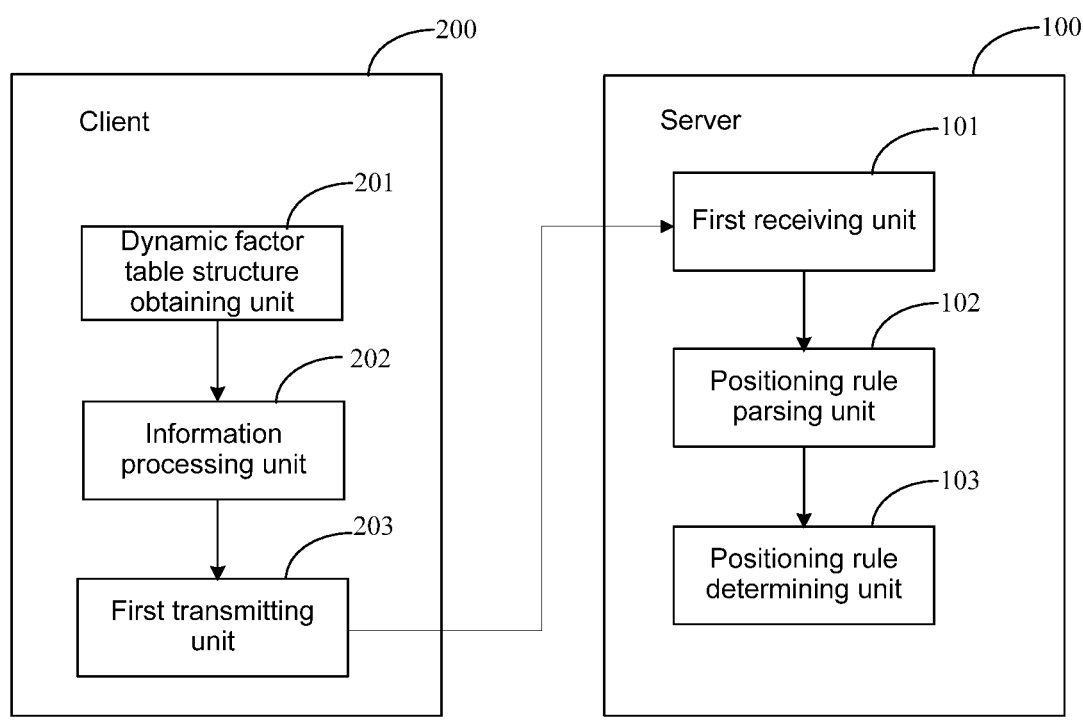
FIG. 27 is a structural block diagram illustrating still another one-time dynamic positioning authentication system according to an embodiment of the present application.

FIG. 27 is a schematic diagram illustrating an embodiment of the another one-time dynamic positioning authentication system according to the present application. The system embodiment is basically corresponding to the method embodiment, and therefore is described briefly. For description of the related parts, refer to the corresponding part in the method embodiment. The system embodiment described below is merely exemplary.

The another one-time dynamic positioning authentication system in this embodiment includes: a server 100 providing an authentication service for a network access user and a client 200 that is connected to the server over a network and provides network login and access for the user.

The client 200 includes: a dynamic factor table structure obtaining unit 201, an information processing unit 202, and a first transmitting unit 203 configured to transmit information to the server.

The dynamic factor table structure obtaining unit 201 is configured to obtain a structure of a full-element dynamic factor table.

The information processing unit 202 is configured to select positioning factors from a positioning factor library based on the dynamic factor table structure and generate a positioning factor string, and input, by the user, a dynamic graphical password based on a full-element dynamic factor table generated based on the positioning factor string.

The first transmitting unit 203 is configured to transmit an authentication information including the dynamic graphical password and information of the full-element dynamic factor table to the server.

The server 100 includes: a first receiving unit 101 configured to receive information from the client, a positioning rule parsing unit 102, and a password determining unit 103.

The first receiving unit 101 is configured to receive the authentication information.

The positioning rule parsing unit 102 is configured to obtain a positioning rule, through parsing, corresponding to the dynamic graphical password.

The positioning rule determining unit 103 is configured to determine that authentication succeeds if the positioning rule obtained through parsing of the dynamic graphical password is consistent with a preset positioning rule.

Optionally, the dynamic factor table structure obtaining unit 201 includes:

an authentication request transmitting subunit, configured to transmit, by the client, an authentication request to the server;

a structure obtaining subunit, configured to receive the structure of the full-element dynamic factor table from the server; and a structure determining subunit, configured to receive the structure for determining the full-element dynamic factor table.

In the another one-time dynamic positioning authentication method provided in this embodiment of the present application, it is on the client that the positioning factors are selected and a positioning factor string is generated, so that the computing resources of the client are fully utilized to effectively share the computing tasks of the server. Therefore, the consumption of computing resources of the server can be effectively reduced, thereby improving the server performance.

Corresponding to the another one-time dynamic positioning authentication method, an embodiment of the present application further provides still another one-time dynamic positioning authentication method (referred to as a third authentication method for short below).

A basic core idea of the third authentication method provided in this embodiment of the present application is that a client and a server separately generate a same full-element dynamic factor table by using a uniform algorithm. In this processing manner, information of the full-element dynamic factor table does not need to be transmitted via a network, which can effectively increase the difficulty in cracking password.

Figure 28:
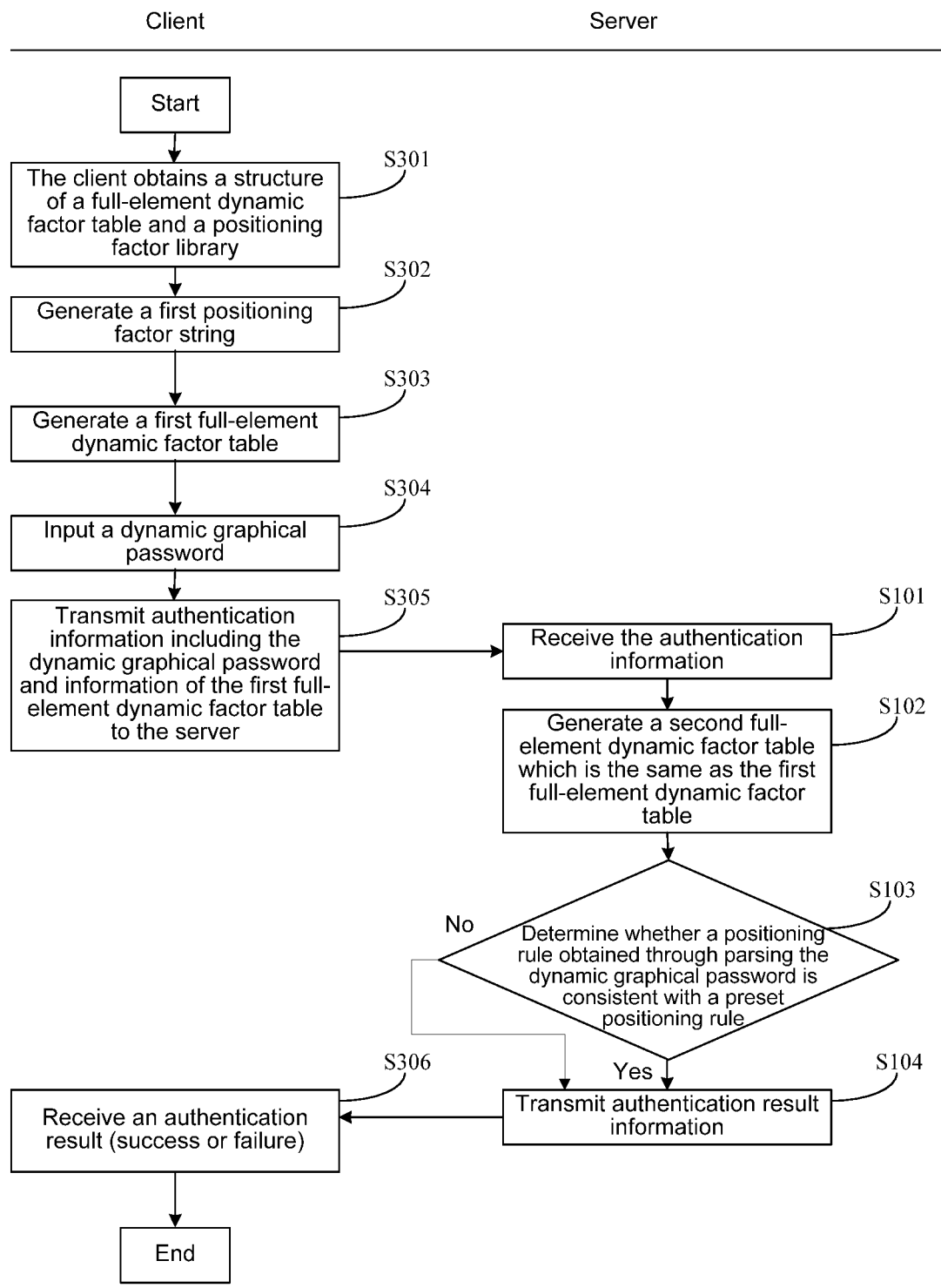
FIG. 28 is a flowchart of yet another one-time dynamic positioning authentication method according to an embodiment of the present application.

FIG. 28 is a flowchart of an embodiment of the third authentication method according to the present application. The parts in this embodiment that are the same as those in the foregoing embodiment are not described repeatedly, referring to the corresponding parts in the foregoing embodiment for details. The third authentication method provided in this embodiment of the present application includes the following steps:

Step S301: A client obtains a structure of a full-element dynamic factor table and a positioning factor library.

The structure of the full-element dynamic factor table may be a common structure, or may be a user-defined structure.

In a specific implementation, step S301 may have a plurality of implementation manners. For example, a common structure of a full-element dynamic factor table and a positioning factor library are obtained locally from the client, a common structure of the full-element dynamic factor table structure and a positioning factor library are obtained from a server, or a user-defined structure of a full-element dynamic factor table and a positioning factor library are obtained from the server.

Step S302: The positioning factors are selected from the positioning factor library based on the dynamic factor table structure to generate a first positioning factor string.

In a specific implementation, the client may firstly generate a shared key, and then generate a first positioning factor string based on the shared key. In a practical application, the shared key may also be generated firstly by the server, and then obtained by the client from the server via. In this processing manner, the difficulty in illegally obtaining a generation algorithm of the shared-key can be increased, so that the difficulty in cracking a password can be effectively increased.

Step S303: a first full-element dynamic factor table is generated based on the first positioning factor string.

Step S304: A user inputs a dynamic graphical password based on the first full-element dynamic factor table generated based on the first positioning factor string.

Step S305: An authentication information including the dynamic graphical password is transmitted to a server.

Because the client and the server separately generate the same dynamic factor table, the authentication information transmitted to the server does not need to include the first full-element dynamic factor table generated by the client.

It should be noted that if the first positioning factor string is generated based on the shared key generated by the client, the shared key needs to be transferred to the server, so that the server can generate a second full-element dynamic factor table, the same as the first full-element dynamic factor table, based on the shared key.

Step S101: The server receives the authentication information transmitted by the client.

As an alternatively implementation manner, the authentication information may further include a time when the client transmits the information. After receiving the authentication information, the server may firstly determine, based on the time parameter, whether a time interval between the time when the client transmits the information and a current time is greater than a preset time interval threshold. If yes, it indicates that a time it takes when the information reaches the server from the client exceeds a set time period. As the operation times out, an information indication of operation timing out is transmitted back to the client, and the current authentication process terminates. A final result is that authentication fails. In this processing manner, the difficulty in cracking password can be further increased.

Step S102: A second full-element dynamic factor table, the same as the first full-element dynamic factor table, is generated.

The server needs to generate a second full-element dynamic factor table that is the same as the first full-element dynamic factor table by using the same dynamic factor table generation algorithm as the client.

Step S103: The server determines whether a positioning rule obtained through parsing of the dynamic graphical password in the authentication information is consistent with a preset positioning rule.

The server parses the dynamic graphical password based on the second full-element dynamic factor table, to obtain a positioning rule corresponding to the dynamic graphical password.

Step S104: Authentication result information is transmitted to the client.

Corresponding to the embodiment of the still another one-time dynamic positioning authentication method, an embodiment of the present disclosure further provides still another one-time dynamic positioning authentication system.

Figure 29:
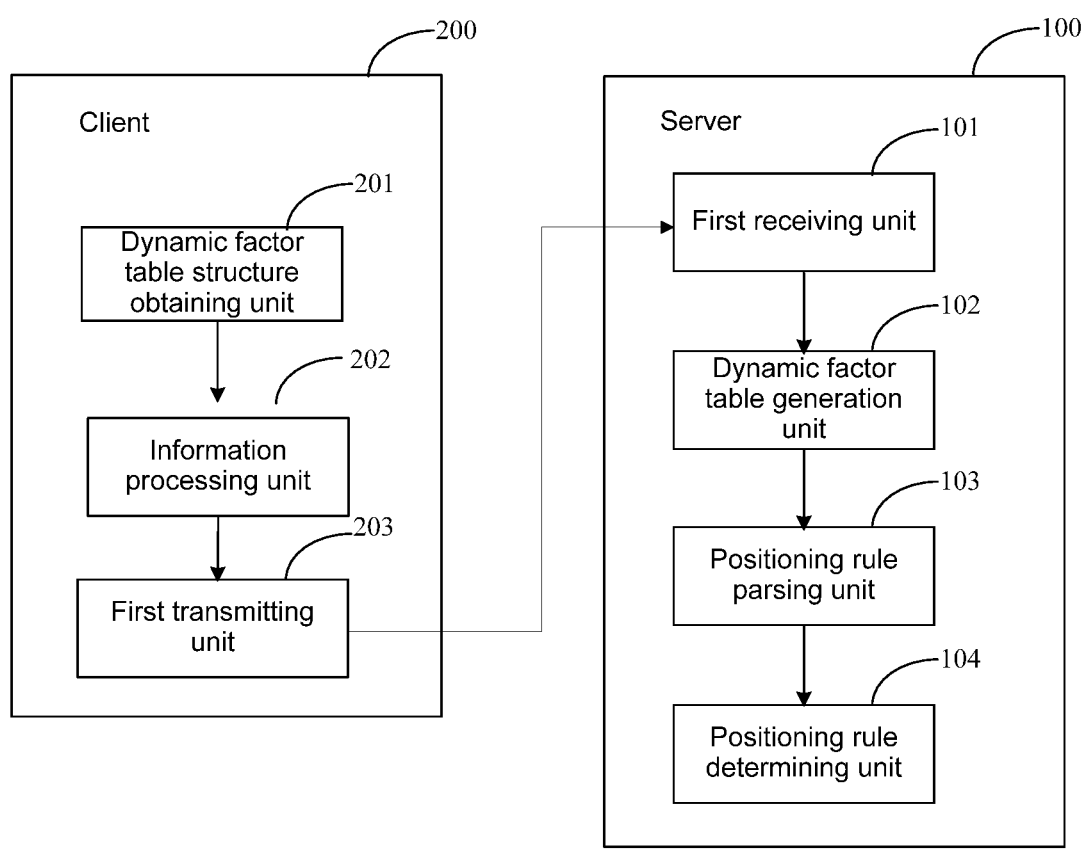
FIG. 29 is a structural block diagram illustrating yet another one-time dynamic positioning authentication system according to an embodiment of the present application.

FIG. 29 is a schematic diagram illustrating an embodiment of the still another one-time dynamic positioning authentication system according to the present application. The system embodiment is basically similar to the method embodiment, and therefore is described briefly, and the description of related parts can refer to the corresponding parts in the method embodiment. The system embodiment described below is merely exemplary.

The still another one-time dynamic positioning authentication system in this embodiment includes: a server 100 providing a authentication service for a network access user and a client 200 that is connected to the server via a network and provides network login and access for the user.

The client 200 includes: a dynamic factor table structure obtaining unit 201, an information processing unit 202, and a first transmitting unit 203 configured to transmit information to the server.

The dynamic factor table structure obtaining unit 201 is configured to obtain a structure of a full-element dynamic factor table.

The information processing unit 202 is configured to select positioning factors from a positioning factor library based on the dynamic factor table structure and generate a first positioning factor string; and input, by the user, a dynamic graphical password based on a first full-element dynamic factor table generated based on the first positioning factor string.

The first transmitting unit 203 is configured to transmit authentication information including the dynamic graphical password to the server.

The server 100 includes: a first receiving unit 101 configured to receive information from the client, a dynamic factor table generation unit 102, a positioning rule parsing unit 103, and a password determining unit 104.

The first receiving unit 101 is configured to receive the authentication information.

The dynamic factor table generation unit 102 is configured to generate a second full-element dynamic factor table that is the same as the first full-element dynamic factor table.

The positioning rule parsing unit 103 is configured to obtain a positioning rule, through parsing, corresponding to the dynamic graphical password based on the second full-element dynamic factor table.

The positioning rule determining unit 104 is configured to determine that authentication succeeds if the positioning rule obtained through parsing of the dynamic graphical password is consistent with a preset positioning rule.

Corresponding to the one-time dynamic password alteration method (referred to as a first password alteration method for short below), an embodiment of the present application further provides another one-time dynamic password alteration method (referred to as a second password alteration method for short below).

The second password alteration method provided in this embodiment of the present application is different from the first password alteration method primarily by that it is on a client that positioning factors are selected and the positioning factor string is generated in the second password alteration method, while it is on a server that positioning factors are selected and positioning factor strings are generated in the first password alteration method.

In the first password alteration method, the server needs to perform computing processing, and therefore some computing resources of the server need to be occupied. When a large number of users perform user password alteration, this processing manner will greatly affects the server performance. To resolve this problem, the second password alteration method is provided in this embodiment of the present application, wherein the positioning factors are selected and the positioning factor strings are generated on the client. In this processing manner, the computing resources of the client are fully utilized to effectively share the computing tasks of the server. Therefore, consumption of the computing resources of the server can be effectively reduced, thereby improving the server performance.

Figure 30:
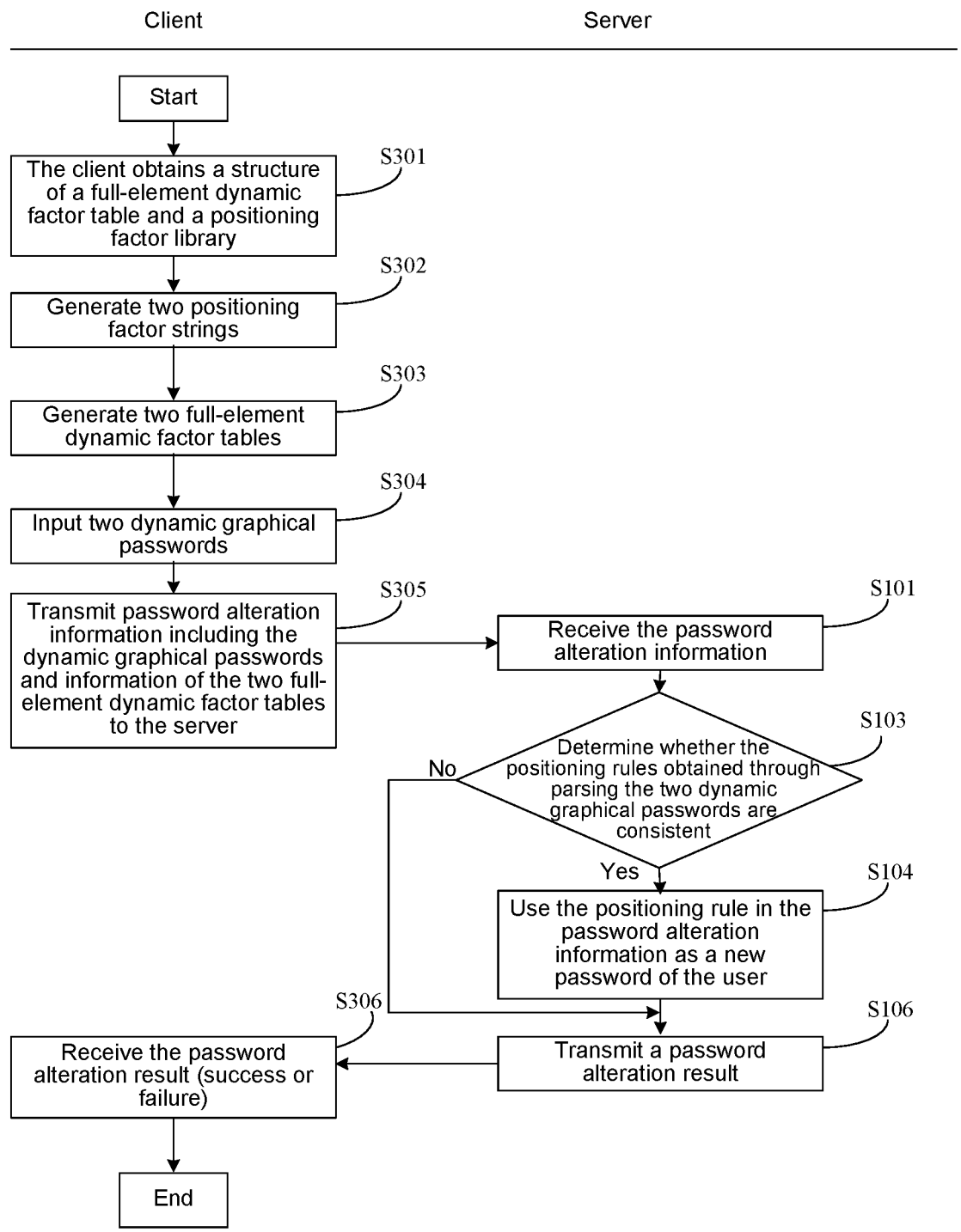
FIG. 30 is a flowchart of a one-time dynamic password alteration method according to an embodiment of the present application.

FIG. 30 is a flowchart of an embodiment of the second password alteration method according to the present application. The parts in this embodiment that are the same as those in the first embodiment are not described repeatedly, referring to the corresponding parts in the first embodiment for details. The second password alteration method provided in this embodiment of the present application includes the following steps:

Step S301: A client obtains a structure of a full-element dynamic factor table and a positioning factor library.

The structure of the full-element dynamic factor table may be a common structure, or may be a user-defined structure.

The positioning factor library includes a plurality of selectable positioning factors. The positioning factors include an English letter, a word, a Chinese character, a numeral, a symbol, an image, and/or a color.

In a specific implementation, step S301 may have a plurality of implementation manners. For example, a common structure of a full-element dynamic factor table and a positioning factor library are obtained locally from the client, a common structure of a full-element dynamic factor table and a positioning factor library are obtained from a server, or a user-defined structure of a full-element dynamic factor table and positioning factor library are obtained from the server.

In a specific implementation, the user-defined structure of the full-element dynamic factor table and positioning factor library may be obtained from the server in the following manner: A user inputs a user name on the client. The client transmits a password alteration request to the server. The server receives the password alteration request and a user ID. The server retrieves a structure of a full-element dynamic factor table and a positioning factor type of the user based on the user ID. The server transmits the structure of the full-element dynamic factor table and the positioning factor type (as a positioning factor library that can be used by the client) to the client.

It should be noted that the structure of the full-element dynamic factor table and the positioning factor library obtained in step S301 may be the same as a structure and a positioning factor type used during user registration, or may be different from the structure and the positioning factor type used during user registration.

After obtaining the structure of the full-element dynamic factor table and the positioning factor library, the client may perform a next step to generate two positioning factor strings.

Step S302: The positioning factors are selected from the positioning factor library based on the dynamic factor table structure, and generate two positioning factor strings.

That is, at step S302, positioning factors are selected from the positioning factor library based on the dynamic factor table structure obtained in the previous step to generate two positioning factor strings. The positioning factor string generated in this step may include all types of positioning factors such as an English letter, a word, a Chinese character, a numeral, a symbol, an image, and a color.

As an alternative implementation manner, at step S302 positioning factors may be selected from positioning factors of types specified by the user based on the dynamic factor table structure to generate the positioning factor string. This processing manner can effectively improve the user experience.

Step S303: Two full-element dynamic factor tables are generated based on the two positioning factor strings.

The two full-element dynamic factor tables can be generated based on the positioning factor strings and the structure of the full-element dynamic factor table.

As an alternative manner, when the positioning factor string is mapped into the full-element dynamic factor table, some particular positioning factors may be further replaced with other content for display. A mapping is formed between a transmitted positioning factor and a displayed positioning factor, which further increases the difficulty in cracking password.

Step S304: A user inputs two dynamic graphical passwords based on the two full-element dynamic factor tables generated based on the two positioning factor strings.

Step S305: Password alteration information including the two dynamic graphical passwords and information of the two full-element dynamic factor tables are transmitted to a server.

Because it is on the client that the full-element dynamic factor tables for inputting the dynamic graphical passwords are generated, information including the dynamic graphical passwords input by the user and the two full-element dynamic factor table generated by the client needs to be transmitted to the server, so as to enable the server to obtain positioning rules through parsing the dynamic graphical passwords.

In a specific implementation, the information of the full-element dynamic factor tables included in the password alteration information may be of a character type (i.e., the positioning factor strings corresponding to the full-element dynamic factor tables), or may be of a picture type (i.e., dynamic factor tables graphic corresponding to the full-element dynamic factor tables). In addition, the password alteration information may further include information such as the user name.

Step S101: The server receives the password alteration information transmitted by the client.

Step S103: The server determines whether positioning rules obtained through parsing the two dynamic graphical passwords in the password alteration information are consistent.

Different from the first password alteration method, in the second password alteration method, the server parses the two dynamic graphical passwords based on the two full-element dynamic factor tables transferred from the client, to obtain the two positioning rules. If the two positioning rules obtained through parsing are consistent, password alteration succeeds, and step S104 is performed to use the positioning rule in the password alteration information as a new password of the user. If the two positioning rules obtained through parsing are inconsistent, password alteration fails, and step S106 is performed to transmit a password alteration result of failure to the client.

Step S104: If the positioning rules obtained through parsing of the two dynamic graphical passwords, the positioning rule in the password alteration information is used as a new password of the user.

Step S106: A password alteration result is transmitted to the client.

Corresponding to the another one-time dynamic password alteration method, an embodiment of the present application further provides still another one-time dynamic password alteration method (referred to as a third password alteration method for short below).

A basic core idea of the third password alteration method provided in this embodiment of the present application is that a client and a server separately generate same full-element dynamic factor tables by using a uniform algorithm. In this processing manner, information of the full-element dynamic factor tables does not need to be transmitted over a network, which can effectively increase the difficulty in cracking password.

Figure 31:
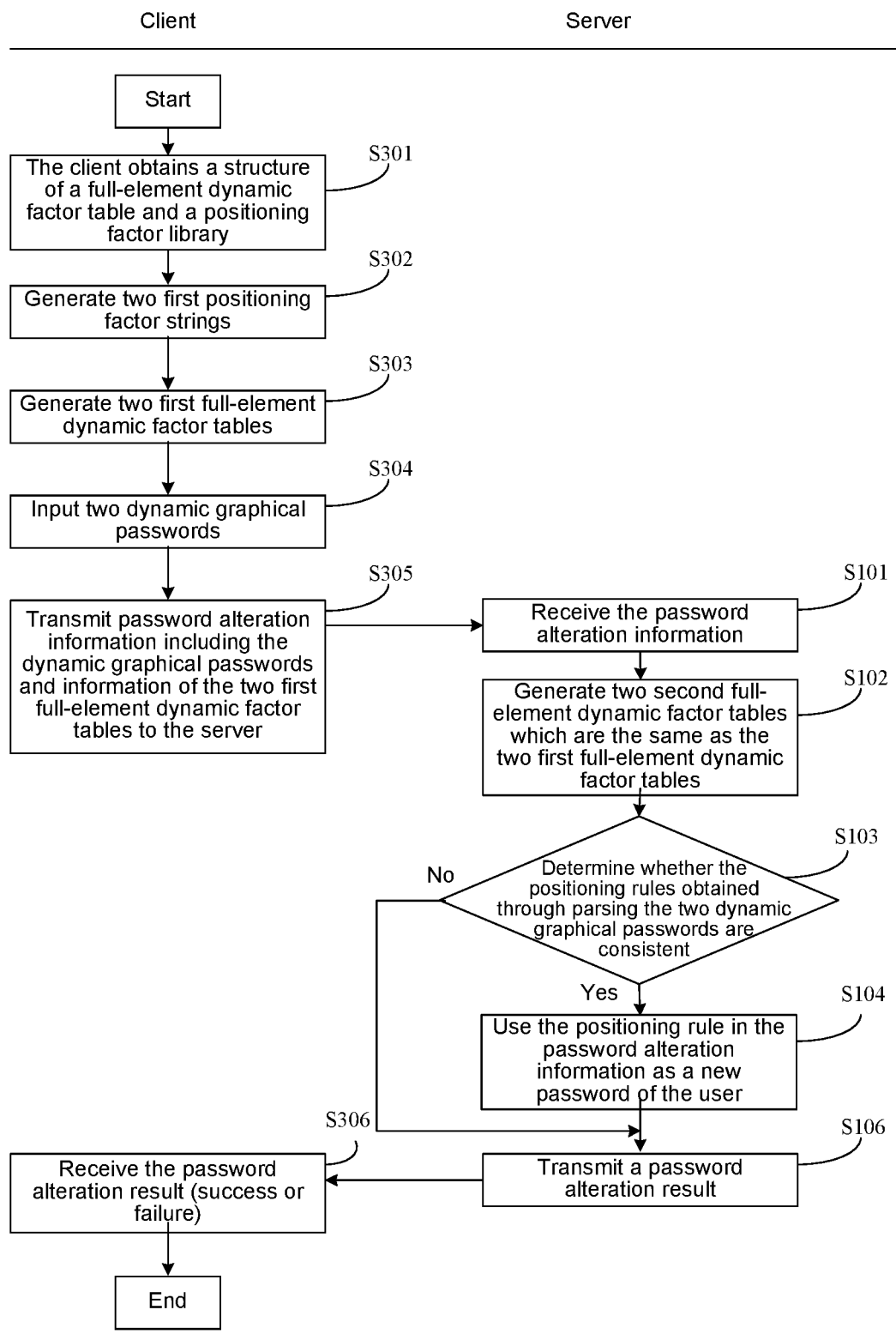
FIG. 31 is a flowchart of another one-time dynamic password alteration method according to an embodiment of the present application.

FIG. 31 is a flowchart of an embodiment of the third password alteration method according to the present application. The parts in this embodiment that are the same as those in the foregoing embodiment are not described repeatedly, referring to the corresponding parts in the foregoing embodiment for detail. The third password alteration method provided in this embodiment of the present application includes the following steps:

Step S301: A client obtains a structure of a full-element dynamic factor table and a positioning factor library.

The structure of the full-element dynamic factor table may be a common structure, or may be a user-defined structure.

In a specific implementation, step S301 may have a plurality of implementation manners. For example, a common structure of a full-element dynamic factor table and a positioning factor library are obtained locally from the client, a common structure of a full-element dynamic factor table and a positioning factor library are obtained from a server, or a user-defined structure of a full-element dynamic factor table and positioning factor library are obtained from the server.

Step S302: The positioning factors are selected from the positioning factor library based on the dynamic factor table structure to generate two first positioning factor strings.

In a specific implementation, the client may firstly generate a shared key, and then generate two first positioning factor strings based on the shared key. In a practical application, the shared key may also be generated firstly by the server, and then obtained by the client from the server via a network. In this processing manner, the difficulty in illegally obtaining a generation algorithm of the shared-key can be increased, so that the difficulty in cracking a password can be effectively increased.

Step S303: A user inputs two dynamic graphical passwords based on two first full-element dynamic factor tables generated based on the two first positioning factor strings, and transmits password alteration information including the two dynamic graphical passwords to a server.

Because the client and the server separately generate the same dynamic factor tables, the password alteration information transmitted to the server does not need to include the two first full-element dynamic factor tables generated by the client.

It should be noted that if the first positioning factor strings are generated based on the shared key generated by the client, the shared key needs to be transferred to the server, so that the server can generate two second full-element dynamic factor tables, the same as the two first full-element dynamic factor tables, based on the shared key.

Step S101: The server receives the password alteration information transmitted by the client.

As an alternative implementation manner, the password alteration information may further include a time when the client transmits the information. After receiving the password alteration information, the server may firstly determine, based on the time parameter, whether a time interval between the time when the client transmits the information and a current time is greater than a preset time interval threshold. If yes, it indicates that a time it takes when the information reaches the server from the client exceeds a set time period. As the operation times out, an operation timeout information indication is transmitted to the client, and the current password alteration process ends. A final result is that password alteration fails. In the processing manner, the difficulty in cracking password can be further increased.

Step S102: Two second full-element dynamic factor tables are generated that are the same as the two first full-element dynamic factor tables.

The server needs to generate two second full-element dynamic factor tables that are the same as the two first full-element dynamic factor tables by using the same dynamic factor table generation algorithm as the client.

Step S103: The two dynamic graphical passwords are parsed based on the two second full-element dynamic factor tables, and if the positioning rules obtained through parsing of the two dynamic graphical passwords are consistent, the positioning rule in the password alteration information is used as a new password of the user, to complete password alteration of the user.

The server parses the two dynamic graphical passwords based on the two second full-element dynamic factor tables, to obtain two positioning rules.

In addition, when the user defines the structure of the full-element dynamic factor table and the positioning factor library on the client, the third password alteration method may further include a step of storing the user-defined structure and/or positioning factor library in correspondence to the user name.

It should be noted that the relation terms herein such as "first" and "second" are used only to differentiate an entity or operation from another entity or operation, and it is not required or implied there exist an actual relationship or order between these entities or operations. Moreover, the terms "include", "comprise", or any other variant thereof are intended to cover a non-exclusive inclusion, so that a process, a method, an article, or a device that includes a series of elements not only includes those elements but also includes other elements which are not expressly listed, or further includes elements inherent to such process, method, article, or device. If no more limitations are made, an element limited by "include a/an . . . " does not exclude other same elements existing in the process, the method, the article, or the device including the element.

The foregoing descriptions are merely specific implementation manners of the present application, so that those skilled in the art can understand or implement the present application. Various modifications to these embodiments will be readily apparent to those skilled in the art, and the general principle defined herein may be applied to other embodiments without departing from the spirit or scope of the present application. Therefore, the present application will not be limited to the embodiments described herein, but extends to the widest scope that complies with the principle and novelty disclosed in this specification.

The invention claimed is:

1. A one-time dynamic positioning authentication method, comprising:
    receiving, by an authentication server, an authentication request from a client;
    generating a positioning factor string based on positioning factors selected from a positioning factor library, determining a structure of the full-element dynamic factor table, including at least using a uniform structure as well as a difficulty coefficient of the full-element dynamic factor table, through negotiation between the authentication server and the client, and transmitting generated information comprising the positioning factor string and a structure of a full-element dynamic factor table to the client;
    receiving, by the client, the generated information, generating the full-element dynamic factor table based on the structure of the full-element dynamic factor table, and mapping the positioning factor string into the full-element dynamic factor table;
    obtaining a dynamic graphical password input by a user according to a first positioning rule, and transmitting the dynamic graphical password to the authentication server; and
    receiving, by the authentication server, the dynamic graphical password from the client, and determining that authentication succeeds if the first positioning rule obtained through parsing, corresponding to the dynamic graphical password, is consistent with a preset positioning rule.

2. The method according to claim 1, wherein the structure of the full-element dynamic factor table comprises a structure of outer table shape and a structure of inner table shape.

3. The method according to claim 2, wherein the authentication request comprises a user ID, and the structure of the full-element dynamic factor table corresponding to the user is determined based on the user ID.

4. The method according to claim 3, wherein the generated information further comprises an inner table change manner; and the mapping the positioning factor string into the full-element dynamic factor table comprises:
mapping the positioning factor string into the full-element dynamic factor table based on the change manner;
wherein the inner table change manner is determined by the authentication server based on a preset algorithm.

5. The method according to claim 2, wherein the generated information further comprises an inner table change manner; and
the mapping the positioning factor string into the full-element dynamic factor table comprises:
mapping the positioning factor string into the full-element dynamic factor table based on the change manner;
wherein the inner table change manner is determined by the authentication server based on a preset algorithm.

6. The method according to claim 2, wherein the generated information further comprises an inner table change manner; and
the mapping the positioning factor string into the full-element dynamic factor table comprises:
mapping the positioning factor string into the full-element dynamic factor table based on the change manner;
wherein the inner table change manner is determined by the authentication server based on a preset algorithm.

7. The method according to claim 1, wherein the generated information further comprises an inner table change manner; and
the mapping the positioning factor string into the full-element dynamic factor table comprises:
mapping the positioning factor string into the full-element dynamic factor table based on the change manner;
wherein the inner table change manner is determined by the authentication server based on a preset algorithm.

8. The method according to claim 7, wherein the first positioning rule comprises one of combining of consecutive positioning factors, combining of non-consecutive positioning factors, combining of repeated positioning factors at a same location, and combining of fixed characters, or any combination thereof.

9. A one-time dynamic positioning authentication method, comprising:
determining a structure of a full-element dynamic factor table, including at least using a uniform structure as well as a difficulty coefficient of the full-element dynamic factor table, through negotiation between an authentication server and a client, generating, by the client, a positioning factor string based on positioning factors selected from a positioning factor library, generating a full-element dynamic factor table based on the structure of the full-element dynamic factor table, and mapping the positioning factor string into the full-element dynamic factor table; obtaining a dynamic graphical password input by a user according to a first positioning rule, and transmitting the dynamic graphical password to an authentication server; and
receiving, by the authentication server, the dynamic graphical password from the client, and determining that authentication succeeds if the first positioning rule obtained through parsing, corresponding to the dynamic graphical password, is consistent with a preset positioning rule.

10. The method according to claim 9, wherein the generating the positioning factor string based on positioning factors selected from a positioning factor library comprises:
obtaining positioning factors selected by a current user and a total number of the positioning factors included in the full-element dynamic factor table; and
generating the positioning factor string based on selected positioning factors and the total number of the positioning factors, wherein a same positioning factor appears at least twice in the positioning factor string.

11. A one-time dynamic positioning authentication system, comprising:
at least one or more processor device;
an authentication server providing authentication for a user, a client providing network login and access for the user, and a positioning factor library, wherein the authentication server comprises: a first receiving unit configured to receive information from the client, a first transmitting unit configured to transmit information to the client, and a positioning factor string generation unit, a positioning rule parsing unit, and a password determining unit that are connected to the first receiving unit and the first transmitting unit;
wherein the positioning factor string generation unit is configured to generate a positioning factor string based on positioning factors selected from a positioning factor library; the first transmitting unit is configured to transmit generated information comprising the positioning factor string and a structure of a full-element dynamic factor table to the client; and the positioning rule parsing unit is configured to receive a dynamic graphical password input by a user according to a first positioning rule, and obtain, through parsing, the first positioning rule corresponding to the dynamic graphical password; and
the password determining unit is configured to determine whether the first positioning rule is consistent with a preset positioning rule, and transmit a determining result to the client by the first transmitting unit; and
the client comprises: a second receiving unit configured to receive information from the authentication server, a second transmitting unit configured to transmit information to the authentication server, and a full-element dynamic factor table display unit and a dynamic graphical password generation unit that are connected to the second receiving unit and the second transmitting unit;
wherein the full-element dynamic factor table display unit is configured to map the positioning factor string into the full-element dynamic factor table; and
the dynamic graphical password generation unit is configured to generate the dynamic graphical password based on input of the user in the full-element dynamic factor table according to the first positioning rule, and transmit the dynamic graphical password to the authentication server by the second transmitting unit,
wherein between the first receiving unit and the first transmitting unit, the server further comprises a first negotiation unit configured to negotiate the structure of the full-element dynamic factor table with the client, that includes at least using a first uniform structure as well as a difficulty coefficient of the full-element dynamic factor table; and
between the second receiving unit and the second transmitting unit, the client further comprises a second negotiation unit configured to negotiate the structure of the full-element dynamic factor table with the server, that includes at least using a second uniform structure as well as a second difficulty coefficient of the full-element dynamic factor table.

12. The system according to claim 11, wherein the system further comprises: a load equalizer, connected to the authentication server, configured to determine whether a load of received authentication requests is greater than a set load threshold, and allocate a last received authentication request to another authentication server if the load is greater than the set load threshold.

13. The system according to claim 11, wherein the system further comprises: a load equalizer, connected to the authentication server, configured to determine whether a load of received authentication requests is greater than a set load threshold, and allocate a last received authentication request to another authentication server if the load is greater than the set load threshold.

14. A one-time dynamic password alteration method, comprising:
obtaining, by an authentication server, a password alteration request from a client;
determining a structure of a full-element dynamic factor table, including at least using a uniform structure as well as a difficulty coefficient of the full-element dynamic factor table, through negotiation between the authentication server and the client, generating two positioning factor strings based on the full-element dynamic factor table, and transmitting the two positioning factor strings to the client at a time;
by the client, receiving the two positioning factor strings, mapping the two positioning factor strings into the full-element dynamic factor tables, respectively, obtaining a first dynamic graphical password, input by a user, from a first full-element dynamic factor table according to a first positioning rule and a second dynamic graphical password, input by the user, from a second full-element dynamic factor table according to a second positioning rule, respectively, and transmitting the first dynamic graphical password and the second dynamic graphical password to the authentication server;
obtaining, by the authentication server, the first dynamic graphical password and the second dynamic graphical password from the client; and if the first positioning rule and the second positioning rule obtained through parsing, corresponding to the two dynamic graphical passwords, are the same, using the first positioning rule or the second positioning rule as a new dynamic graphical password, indicating that password alteration succeeds, or otherwise, indicating that password alteration fails; and
receiving, by the client, a password alteration success or failure result transmitted by the authentication server.

15. The method according to claim 14, wherein obtaining, by the authentication server, the first dynamic graphical password and the second dynamic graphical password comprises:
obtaining firstly, by the authentication server, the pre-alteration password from the client, and if the pre-alteration password is the same as a preset password, obtaining secondly the first dynamic graphical password and the second dynamic graphical password; or
obtaining simultaneously, by the authentication server, the pre-alteration password, the first dynamic graphical password, and the second dynamic graphical password from the client.

16. A one-time dynamic positioning authentication method, comprising:
determining a structure of a full-element dynamic factor table, including at least using a uniform structure as well as a difficulty coefficient of the full-element dynamic factor table, through negotiation between an authentication server and a client, obtaining, by the client, the structure of the full-element dynamic factor table;
selecting positioning factors from a positioning factor library based on the structure of the full-element dynamic factor table and generating a first positioning factor string;
inputting, by a user, a dynamic graphical password based on a first full-element dynamic factor table generated based on the first positioning factor string, and transmitting an authentication information comprising the dynamic graphical password to an authentication server;
receiving, by the authentication server, the authentication information transmitted by the client;
generating a second full-element dynamic factor table that is the same as the first full-element dynamic factor table; and
parsing the dynamic graphical password based on the second full-element dynamic factor table, and determining that authentication succeeds if a positioning rule obtained through parsing, corresponding to the dynamic graphical password, is consistent with a preset positioning rule.

17. A one-time dynamic positioning authentication system, comprising:
an authentication server providing an authentication service for a network access user and a client that is connected to the authentication server over a network and provides network login and access for the user, wherein the client comprises:
a dynamic factor table structure obtaining unit, an information processing unit, and a first transmitting unit configured to transmit information to the authentication server;
wherein the dynamic factor table structure obtaining unit is configured to obtain a structure of a full-element dynamic factor table, including at least using a uniform structure as well as a difficulty coefficient of the full-element dynamic factor table, through negotiation between the authentication server and the client;
the information processing unit is configured to select positioning factors from a positioning factor library based on the structure of the full-element dynamic factor table and generate a first positioning factor string; and input, by the user, a dynamic graphical password based on a first full-element dynamic factor table generated based on the first positioning factor string; and
the first transmitting unit is configured to transmit an authentication information comprising the dynamic graphical password to the authentication server;
the authentication server comprises: a first receiving unit configured to receive information from the client, a dynamic factor table generation unit, a positioning rule parsing unit, and a positioning rule determining unit;
wherein the dynamic factor table generation unit is configured to generate a second full-element dynamic factor table that is the same as the first full-element dynamic factor table;
the positioning rule parsing unit is configured to parse the dynamic graphical password based on the second full-element dynamic factor table, to obtain a positioning rule corresponding to the dynamic graphical password; and
the positioning rule determining unit is configured to determine that authentication succeeds if the positioning rule corresponding to the dynamic graphical password is consistent with a preset positioning rule.

* * * * *